US012413273B1

(12) United States Patent
Madanayake

(10) Patent No.: US 12,413,273 B1
(45) Date of Patent: Sep. 9, 2025

(54) SYSTEMS AND METHODS FOR REDUCING COMPLEXITY WITHIN VIRTUAL SUB-ARRAYS

(71) Applicant: Habarakada Liyanachchi Prabath Arjuna Madanayake, Miami, FL (US)

(72) Inventor: Habarakada Liyanachchi Prabath Arjuna Madanayake, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/197,275

(22) Filed: May 2, 2025

Related U.S. Application Data

(60) Provisional application No. 63/642,384, filed on May 3, 2024.

(51) Int. Cl.
*H04B 7/0426* (2017.01)
*H04B 7/0456* (2017.01)

(52) U.S. Cl.
CPC ........... *H04B 7/043* (2013.01); *H04B 7/0482* (2013.01)

(58) Field of Classification Search
CPC .............................. H04B 7/043; H04B 7/0482
See application file for complete search history.

(56) References Cited

U.S. PATENT DOCUMENTS

2015/0355313 A1* 12/2015 Li ........................... G01S 13/66
342/195

OTHER PUBLICATIONS

Coutinho et al., "A Low-SWaP 16-Beam 2.4 GHz Digital Phased Array Receiver Using DFT Approximation", IEEE Transactions on Aerospace and Electronic Systems, vol. 56, Issue: 5, pp. 3645-3654 (Year: 2020).*

* cited by examiner

*Primary Examiner* — Vineeta S Panwalkar
(74) *Attorney, Agent, or Firm* — SALIWANCHIK, LLOYD & EISENSCHENK

(57) ABSTRACT

Systems and methods are provided for reducing the computational complexity and all-to-all (A2A) communication within virtual sub-arrays (VSAs) while enabling distributed parallel edge processing. This can help solve the beamforming problem described by The United States Defense Advanced Research Projects Agency (DARPA) state of the art array processor (SOAP) unclassified program. The use of all-digital transmit/receive antenna apertures for adaptive beamforming algorithms necessitate inversion of large matrices. The matrix inversions become intractably difficult for emerging all-digital apertures. This complexity problem associated with large all-digital aperture arrays can be solved with a two-level approach.

20 Claims, 29 Drawing Sheets

| | Traditional | Proposed |
|---|---|---|
| M-beam DFT multi-beams | $O(M \log M)$ - FFT | $O(M)$ - AFFT |
| Covariance matrix inversion where $N = (Mp)^2$ | $O(M^6 p^6)$ | $O(p^6)$ |
| Algorithm Type | Adaptive | Fixed-Beam + Adaptive |
| Connectivity | All-to-all across aperture | All-to-all across VSAs |
| Multiple RFI nulling? | Yes | Yes |
| Multiple full-aperture beams? | Yes | Yes |
| Complexity for 128 elements & VSA size 8 elements | 896 MACs for FFT and 2,097,152 MACs for covariance matrix inversion | 128 MACs for AFFT and 4096 MACs for covariance matrix inversion |
| Scalable for massive N? | No | Yes |

FIG. 2

|                | Test with RFIs | | No RFI (Reference) |
|---|---|---|---|
| Beamforming    | ✓     | ✗     | ✓     |
| Nulling        | ✓     | ✗     | ✗     |
| Wild unknowns  | ✓     | ✓     | ✓     |
| SINR (dB)      | 22.2  | 8.7   | 21.3  |
| 16QAM Accuracy | 81.0% | 9.8%  | 97.0% |
| 32QAM Accuracy | 92.0% | 0.0%  | 98.6% |

FIG. 14

SYSTEMS AND METHODS FOR REDUCING COMPLEXITY WITHIN VIRTUAL SUB-ARRAYS

CROSS-REFERENCE TO RELATED APPLICATION

This application claims the benefit of U.S. Provisional Application Ser. No. 63/642,384, filed May 3, 2024, the disclosure of which is hereby incorporated by reference in its entirety, including all figures, tables, and drawings.

BACKGROUND

The United States Defense Advanced Research Projects Agency (DARPA) state of the art array processor (SOAP) unclassified program describes beamforming problems. The use of all-digital transmit/receive antenna apertures for adaptive beamforming algorithms necessitate inversion of large matrices. The matrix inversions become intractably difficult for emerging all-digital apertures.

BRIEF SUMMARY

Embodiments of the subject invention provide novel and advantageous systems and methods for reducing the computational complexity and all-to-all (A2A) communication within virtual sub-arrays (VSAs) while enabling distributed parallel edge processing. This can help solve the beamforming problem described by The United States Defense Advanced Research Projects Agency (DARPA) state of the art array processor (SOAP) unclassified program. The use of all-digital transmit/receive antenna apertures for adaptive beamforming algorithms necessitate inversion of large matrices. The matrix inversions become intractably difficult for emerging all-digital apertures. Embodiments of the subject invention solve the complexity problem associated with large all-digital aperture arrays using a two-level approach.

In an embodiment, a system for beamforming can comprise: a plurality of subarrays, each subarray of the plurality of subarrays comprising a plurality of antennas; a plurality of approximate discrete Fourier transform (ADFT) beamformers; and an adaptive beamformer. The plurality of ADFT beamformers can be configured to receive and process signals from the plurality of subarrays, respectively, and the plurality of ADFT beamformers can be configured to generate respective ADFT beamformer outputs after processing the signals from the plurality of subarrays, respectively. The adaptive beamformer can be configured to receive and process the ADFT beamformer outputs and generate a final beamforming output. The adaptive beamformer can be, for example, a Howells-Applebaum adaptive beamformer, a minimum variance distortionless response (MVDR) adaptive beamformer, or a linearly constrained minimum variance (LCMV) adaptive beamformer. Each ADFT beamformer of the plurality of ADFT beamformers can be, for example, a 32-point ADFT beamformer. Each subarray of the plurality of subarrays can further comprise: at least one amplifier connected to at least one antenna of the plurality of antennas of said subarray; at least one filter connected to at least one antenna of the plurality of antennas of said subarray; and/or at least one mixer connected to at least one antenna of the plurality of antennas of said subarray. The at least one filter can comprise, for example, a band-pass filter and/or a low-pass filter. For example, as seen in FIG. 3a, each antenna of each subarray can have an amplifier (e.g., a low noise amplifier (LNA) and/or a standard amplifier), a filter (e.g., a band-pass filter (BPF) and/or a low-pass filter (LPF), and/or a mixer). The system can further comprise at least one analog-to-digital converter (ADC) connected between each ADFT beamformer of the plurality of ADFT beamformers and the subarray from which said ADFT beamformer is configured to receive and process signals (e.g., as seen in FIG. 3a, each antenna of each subarray can have an ADC connected between the antenna and the ADFT beamformer). The system can further comprise at least one radio frequency (RF) chain connected between each ADFT beamformer of the plurality of ADFT beamformers and the subarray from which said ADFT beamformer is configured to receive and process signals.

In another embodiment, a method for beamforming can comprise: providing a system having any or all of the features discussed in the previous paragraph; sending signals from the plurality of subarrays to the plurality of ADFT beamformers, respectively; processing, by the plurality of ADFT beamformers, the signals respectively received from the plurality of subarrays to generate respective ADFT beamformer outputs; sending the ADFT beamformer outputs from the plurality of ADFT beamformers to the adaptive beamformer; and processing, by the adaptive beamformer, the ADFT beamformer outputs to generate a final beamforming output. The adaptive beamformer can be, for example, a Howells-Applebaum adaptive beamformer, an MVDR adaptive beamformer, or an LCMV adaptive beamformer. Each ADFT beamformer of the plurality of ADFT beamformers can be, for example, a 32-point ADFT beamformer.

BRIEF DESCRIPTION OF DRAWINGS

FIG. 2 shows a table comparing systems and methods of embodiments of the subject invention and systems and methods of the related art.

FIG. 3a shows a schematic of a 32-beam subsystem at 5.8 gigahertz (GHz). FIG. 3b shows plots of magnitude (in decibels (dB)) versus normalized frequency for ADFT beams obtained using the 32-point discrete Fourier transform (DFT). FIG. 3c shows a plot of magnitude (in dB) versus normalized frequency showing error between two transforms. FIG. 3d shows plots of gain (in dB) versus angle (in degrees) for measured beams from the 5.8 GHz array using fast Fourier transform (FFT) and ADFT in factored matrix format (AFFT).

FIG. 6b shows a zoomed region of the plot of FIG. 6a.

In FIG. 7a, the desired reception was 30 degrees; and in FIG. 7b, the desired reception was -30 degrees.

FIG. 12a shows an array pattern for one RFI at 0 degrees; the desired reception was 30 degrees. FIG. 12b shows an array pattern for two RFIs at 0 degrees and 10 degrees; the desired reception was -30 degrees. FIG. 12c shows an array pattern for three RFIs at 0 degrees, 25 degrees, and 30 degrees; the desired reception was -40 degrees. FIG. 12d shows an array pattern for four RFIs at -30 degrees, -20 degrees, 15 degrees, and 25 degrees; the desired reception was 0 degrees. FIG. 12e shows an array pattern for five RFIs at -30 degrees, -20 degrees, -10 degrees, 15 degrees, and 40 degrees; the desired reception was 0 degrees. FIG. 12f shows an array pattern for six RFIs at -30 degrees, -20 degrees, -10 degrees, 15 degrees, 25 degrees, and 40 degrees; the desired reception was 0 degrees.

FIG. 13a shows an array pattern for one RFI at -20 degrees; the desired reception was 0 degrees. FIG. 13b shows an array pattern for two RFIs at -20 degrees and 15 degrees; the desired reception was 10 degrees. FIG. 13c shows an array pattern for three RFIs at -30 degrees, -20 degrees, and 15 degrees; the desired reception was 0 degrees. FIG. 13d shows an array pattern for four RFIs at -30 degrees, 0 degrees, 10 degrees, and 20 degrees; the desired reception was -10 degrees. FIG. 13e shows an array pattern for five RFIs at -25 degrees, -10 degrees, 10 degrees, 20 degrees, and 30 degrees; the desired reception was 0 degrees. FIG. 13f shows an array pattern for six RFIs at -30 degrees, -20 degrees, -10 degrees, 0 degrees, 20 degrees, and 40 degrees; the desired reception was 10 degrees.

FIG. 14 shows a table of modulation recognition results under RFI and no RFI conditions. Three RFI sources were used to simulate jammers. The real-world test environment included "in the wild" interference from WiFi (and other sources) that could not be controlled.

DETAILED DESCRIPTION

Figure 1:
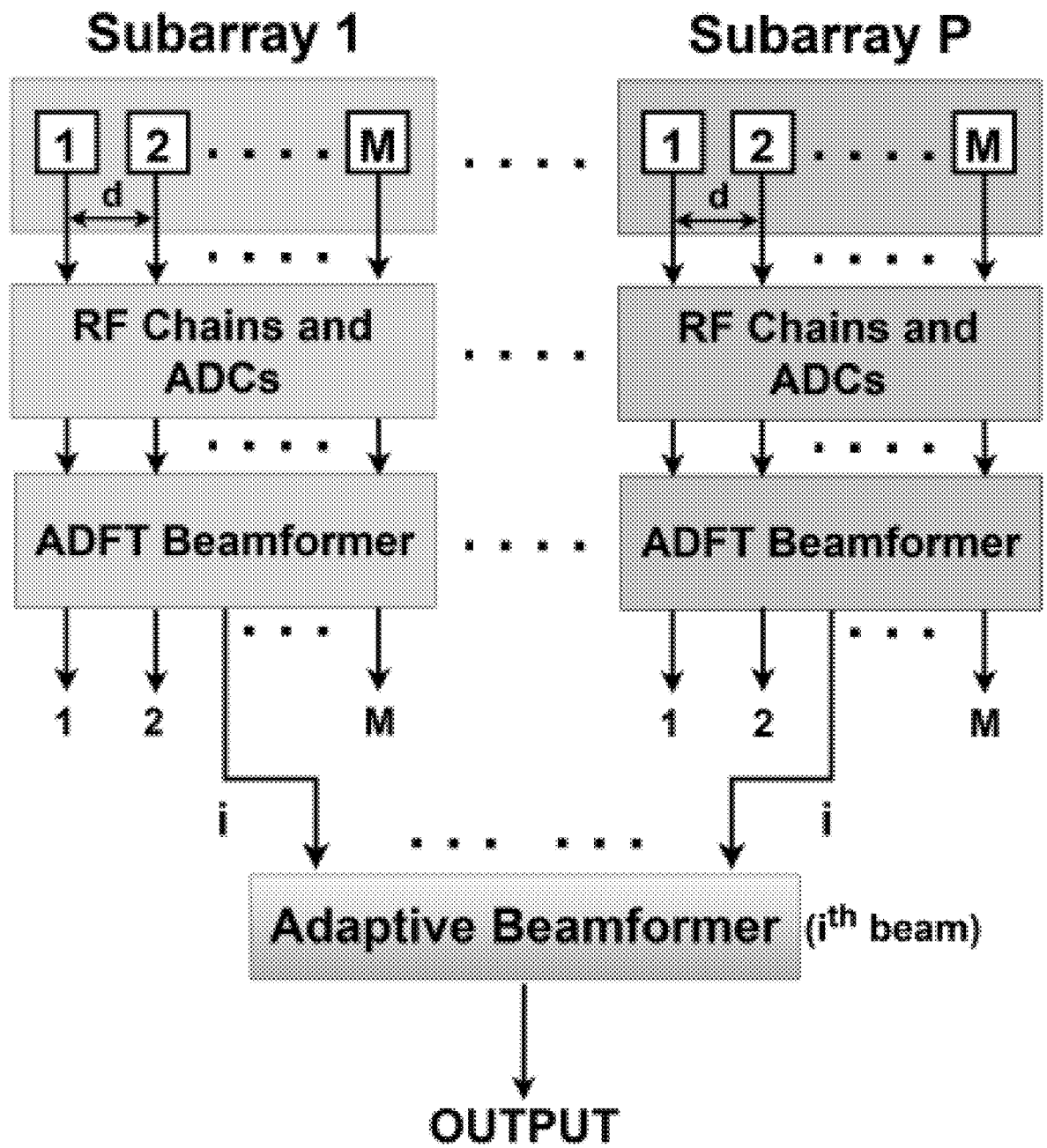
FIG. 1 shows the architecture of a combined approximate discrete Fourier transform (ADFT) and adaptive beamformer, according to an embodiment of the subject invention.
Figure 3A:
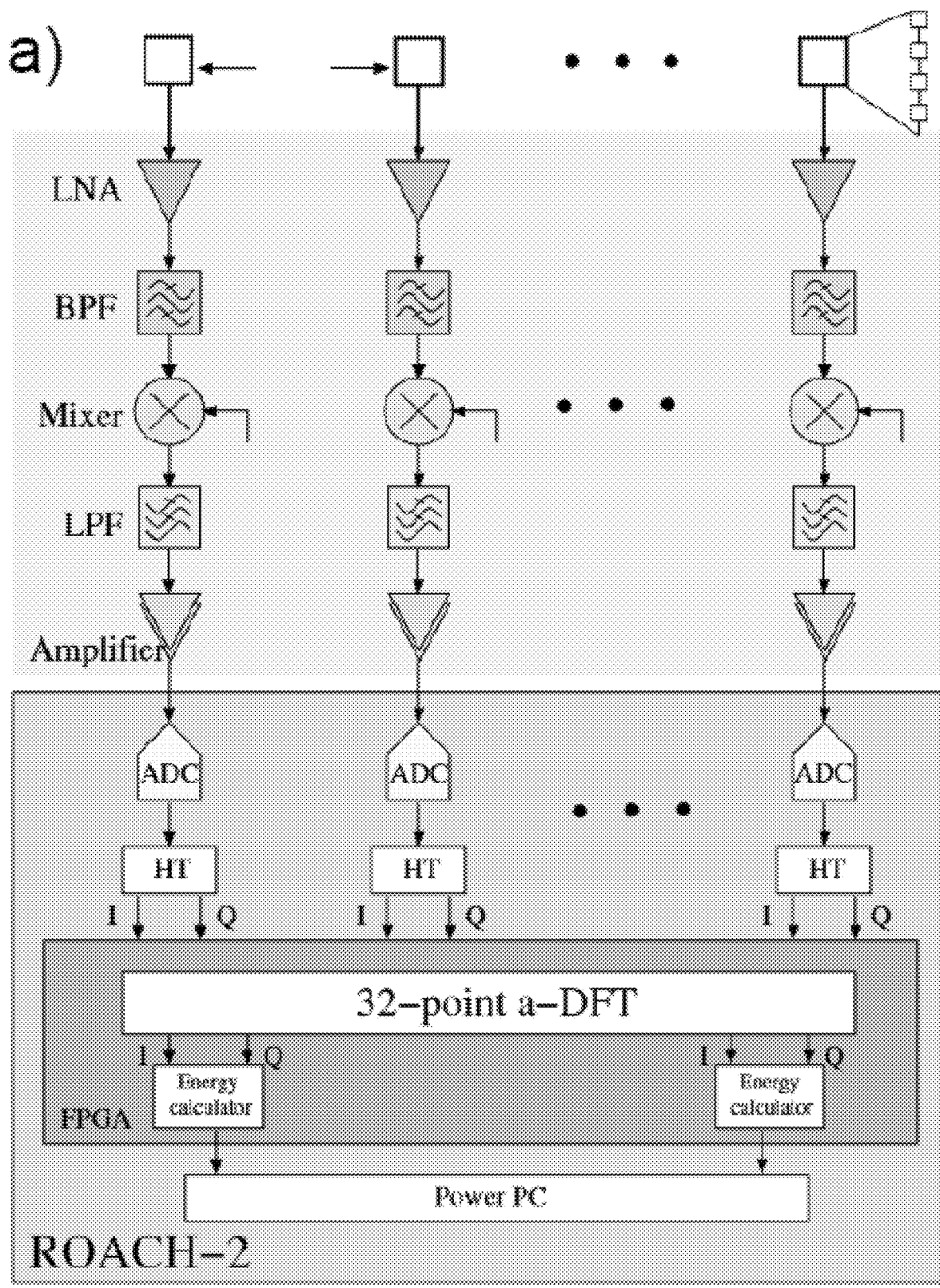
FIGS. 3a-3d show 1024-beams using 961 multiply accumulates (MACs), which is O(n) arithmetic complexity (far smaller than O(N log N) for large N).
Figure 3B:
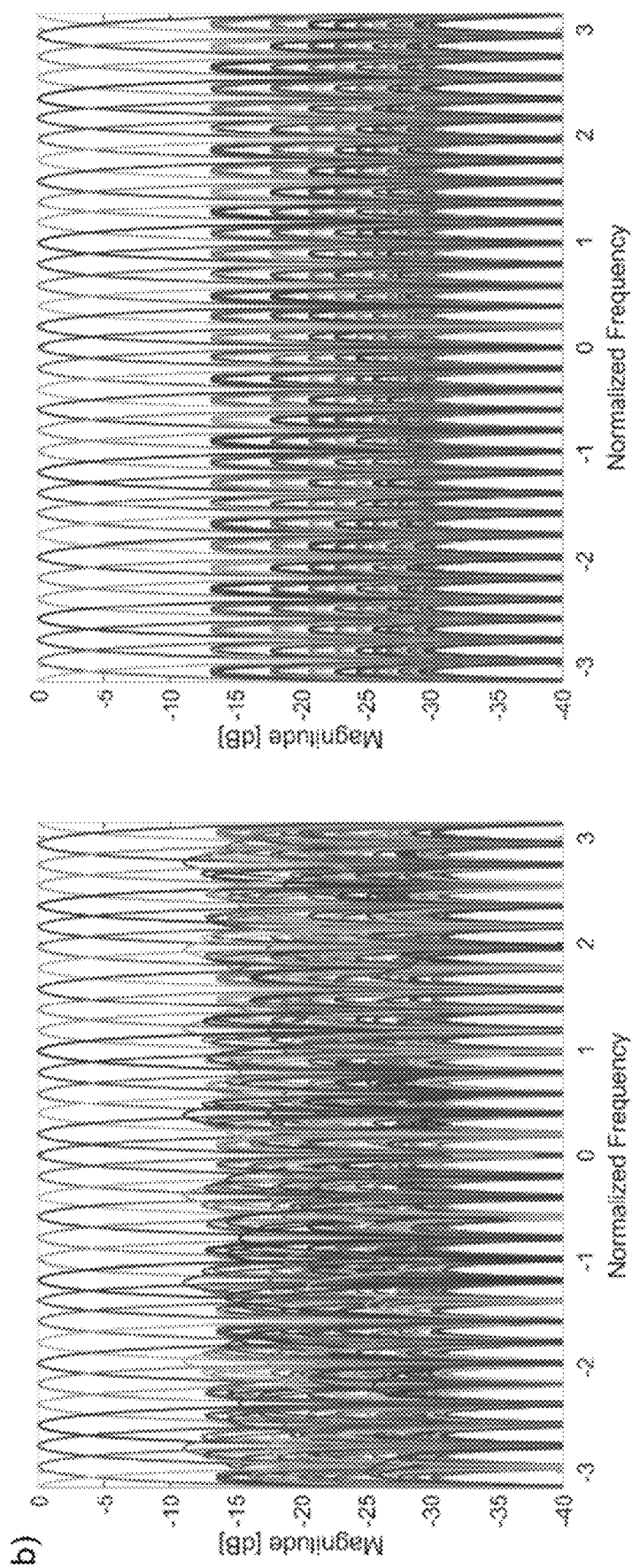
Figure 3C:
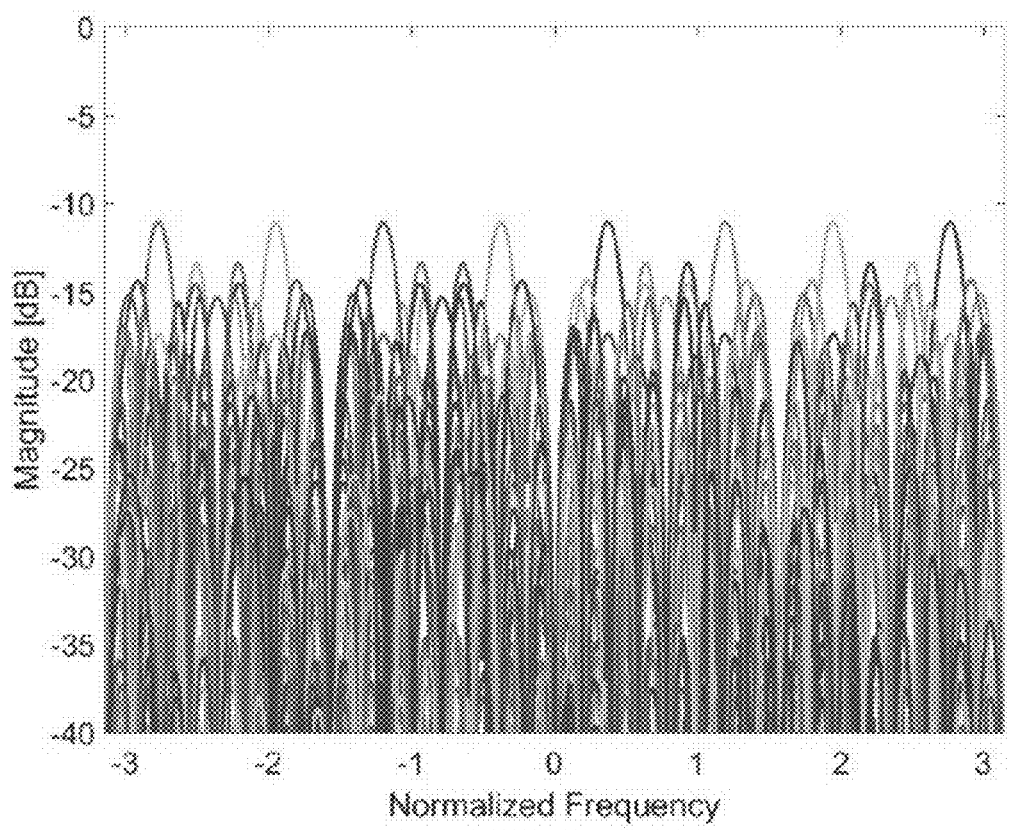
Figure 3D:
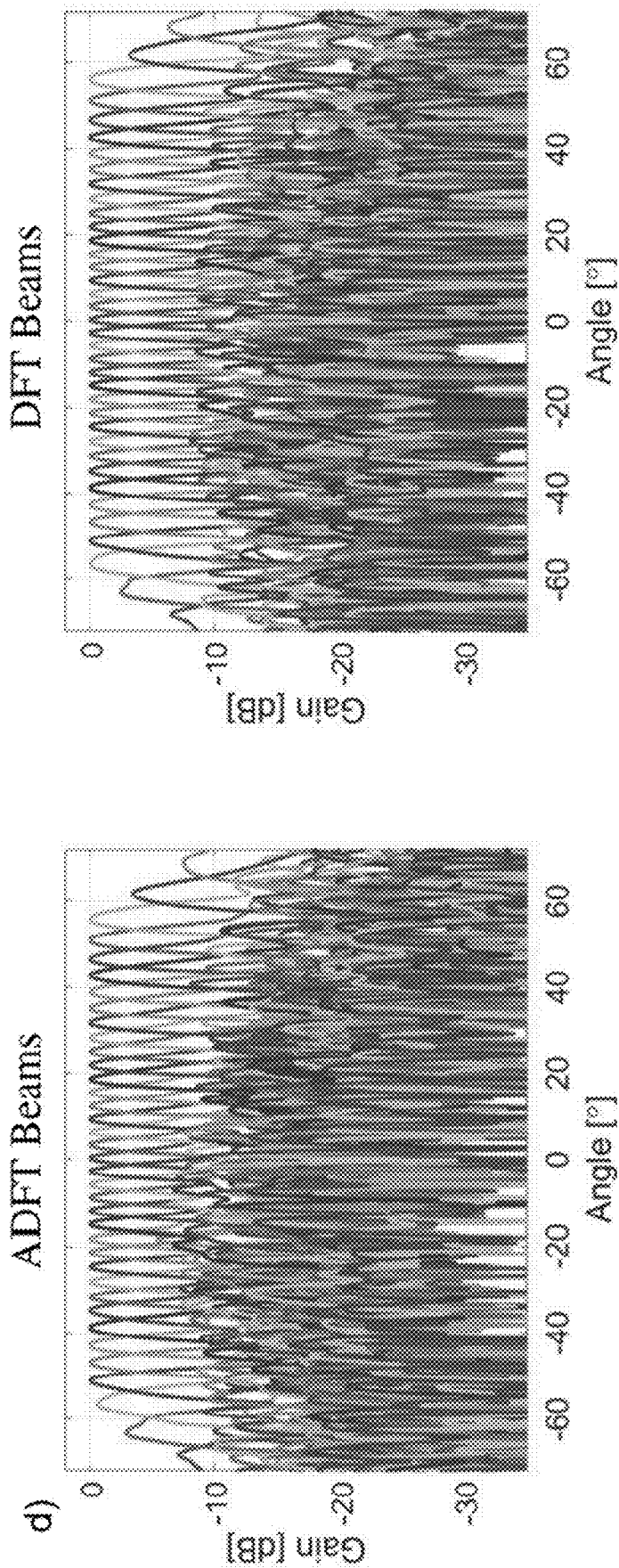

Embodiments of the subject invention provide novel and advantageous systems and methods for combined approximate discrete Fourier transform (ADFT) and adaptive beamformers for uniform linear arrays (e.g., comprising a plurality of subarrays, each having a plurality of antennas). A quantity of ADFT beamformers (equal to the quantity of subarray) can be employed to process signals received by subarrays, and the outputs of these subarrays can then be processed by an adaptive beamformer. The combined beamformer provides the benefits of both discrete Fourier transform (DFT) and adaptive beamformers. Embodiments of the subject invention also provide novel and advantageous systems and methods for reducing the computational complexity and all-to-all (A2A) communication within virtual subarrays (VSAs) while enabling distributed parallel edge processing. This can help solve the beamforming problem described by The United States Defense Advanced Research Projects Agency (DARPA) state of the art array processor (SOAP) unclassified program. The use of all-digital transmit/receive antenna apertures for adaptive beamforming algorithms necessitate inversion of large matrices. The matrix inversions become intractably difficult for emerging all-digital apertures. Embodiments of the subject invention solve the complexity problem associated with large all-digital aperture arrays and can be particularly helpful for Department of Defense (DoD) applications (e.g., for companies such as Lockheed Martin).

Embodiments of the subject invention solve the challenges associated with intractable high complexity of defense radar apertures (as described by the DARPA SOAP solicitation). The solicitation is a public domain description of the complexity problem and requests fundamental research contributions. Embodiments drastically reduce arithmetic complexity of all-digital aperture arrays used for radar (e.g., military radar) from $O(M^6p^6)$ down to $O(p^6)$ for matrix inversion, and $O(N)$ from $O(N \log N)$ for fast Fourier transform (FFT) multi-beams. Embodiments allow all-digital radio frequency interference (RFI) nulling in the spatial domain with significantly reduced arithmetic complexity, which enables reduced chip area and power consumption.

Embodiments have applications in, for example, active electronically scanned apertures (AESA), phased-array apertures, radar apertures multiple-input and multiple-output (MIMO) wireless systems, large intelligent surfaces (LIS), reconfigurable intelligent surfaces (RIS), wireless 5G/6G base stations for low earth orbit (LEO), and satcom terminals.

Embodiments of the subject invention can reduce the computational complexity and A2A communication within VSAs while enabling distributed parallel edge processing. Assume an aperture with $p_1 \times p_2$ grid of $M_1 \times M_2$ VSAs. The total number of elements is $N = M_1 p_1 M_2 p_2$. The original covariance matrix was $N \times N$ and its inversion required $\mathcal{O}(N^3)$ operations (time complexity). Embodiments of the subject invention can use multi-beams with optimal adaptive nulling (i.e., Weiner solution, see also; Haykin, Adaptive Filter Theory, 5th ed., Pearson, Jun. 2, 2013; which is hereby incorporated by reference herein in its entirety)) achieved via a two-level approach. Level 1 is low complexity VSA beams, with non-sparse 2D approximate-FFT (AFFT) in the spatial domain to achieve N radio frequency (RF) beams using $\mathcal{O}(N)$ multiply-accumulates (MACs)—a factor of $\log_2 N$ smaller than that of FFTs. Level 2 is low complexity adaptive nulls, in which the original covariance matrix inversion operation $\mathcal{O}(N^3) = \mathcal{O}(M_1^3 p_1^3 M_2^3 M_2^3)$ is reduced by factor $M_1^2 p_2^2$ down to a tiny $\mathcal{O} M_1 M_2 p_1^3 p_2^3$) while allowing nulling of $p_1 p_2 - 1$ RFI sources. Taking $p_1 = p_2 = 4$, $M_1 = 8$, and $M_2 = 1$ $N = 128$ elements are obtained, where VSAs are 8×1 and are set in a 4×4 grid for 15 RFIs.

In one embodiment, the system and/or method can realize scalable algorithms for digital array computations. FFTs are a class of fast butterfly algorithms for efficiently realizing N-point DFTs at low multiplication complexity. FFTs reduce the $\mathcal{O}(N^2)$ matrix-vector multiplication complexity of a DFT down to $\mathcal{O}(N \log N)$ using sparse matrix factorizations, a major reduction for large N. Precise lower bounds on FFT complexity as a function of discrete Fourier transform (DFT) size N are known (see also; Heideman, Multiplicative Complexity, Convolution, and the DFT, 1st ed., ser. Signal Processing and Digital Filtering, Springer New York, NY, November 2012, Online at doi.org/10.1007/978-1-4612-3912-3; which is hereby incorporated herein by reference in its entirety). From a theoretical computer science standpoint, reducing complexity beyond FFT lower bounds is provably impossible. This limitation arises due to an underlying assumption, namely the use of exact computations.

In order to get around the FFT complexity bounds, embodiments can use approximation tactfully in computing DFTs at $\mathcal{O}(N)$ without having significant consequences in beam fidelity (see also; Portella, et al., Radixn algorithm for computing n2n-point DFT approximations, IEEE Signal Processing Letters, vol. 29, pp. 1838-1842, 2022; which is hereby incorporated herein by reference in its entirety). It is wasteful to pair noisy, distorted antenna signals with the perfect mathematics of the theoretical computer science world. Using AFFTs (AFFT refers to an approximate DFT with a factorization comprising multiplier less sparse matrix factors, much like an FFT) by design, causing errors that are below the dynamic range, FFT complexity can be substantially reduced without a noticeable loss of performance (penalty better than 2 decibels (dB) of beam selectivity), which is acceptable for aperture applications. AFFTs can realize approximate-DFTs at $\mathcal{O}(N)$ multiplier count. This is a massive reduction in multiplier complexity over FFTs. AFFTs of embodiments of the subject invention are within 2 dB of the worst-case sidelobe level of FFT but at reduced computational complexity, thus resulting in a reduction in size, weight, and power (SWaP) and increased throughput (speed/bandwidth). An AFFT 32×32 multi-beam beamformer design for 1024 beams can be used in some embodiments. Field programmable gate array (FPGA) tests (32 simultaneous beams at 5.8 gigahertz (GHz)) and 45 nanometers (nm) application specific integrated circuit (ASIC) was completed (no fabrication). The smallest A2A edge-processor building block was limited up to 32-point AFFTs. The approach allowed reduction of the arithmetic complexity for N-beams to $\mathcal{O}(N)$. For example, using radix-32 decomposition and 32-point AFFT blocks in A2A configuration, a 1024-point AFFT with 961 MACs and 1024 RF beams was achieved.

Assume an aperture is square and comprises a p×p grid of VSAs, where each VSA is square and has a uniform and spatially Nyquist spaced M×M VSA grids of wideband elements. The full aperture is therefore Mp×Mp with total elements $N = M^2 p^2$. In a small-scale system, there may be a typical one VSA case with p=1 and M=8 elements in each dimension. This is an 8×8 sub-array with N=64 channels. An 8×8 grid of orthogonal RF beams can be computed using AFFTs applied spatially, first along rows, and then along columns, leading to a two-dimensional (2D) FFT with corresponding 2D mesh grid of RF beams computed in a parallel mesh of A2A edge-processors. The arithmetic complexity is $\mathcal{O}(2M^2 \log_2 M)$, and this is reasonable for typically small (M=8), which gives 64 RF beams.

Adaptive beamforming algorithms, such as the Applebaum algorithm, require the measurement (snapshots), computation, and subsequent inversion of a covariance matrix of size N×N (see also; Applebaum, Adaptive arrays, IEEE Transactions on Antennas and Propagation, vol. 24, no. 5, pp. 585-598, 1976; which is hereby incorporated by reference herein in its entirety). The inversion operation has arithmetic (time) complexity $\mathcal{O}(N^3)$, where N is the number of elements in the array. Embodiments can reduce matrix inversions by up to a factor of $M^6$, which is a huge reduction. This is demonstrated in FIG. 2, which compares related art systems (labeled as "Traditional") and systems of embodiments of the subject invention (labeled as "Proposed").

With respect to a problem with covariance matrix inversion, the arithmetic complexity of matrix inversion becomes intractably hard even for modest sized N as there is an associated need for speed in DoD phased-array aperture use cases. The cross correlation matrices must be inverted within microseconds in order to track extremely fast changing RF environments. Emerging apertures may have more than 1024 elements. Computing the required algorithms at a central location is no longer scalable, and the circuit complexity and power consumption is impractical for mobile/airborne applications.

In many embodiments, architectures can scale to extremely large aggregate data rates.

In some embodiments, AFFT-based $\mathcal{O}(N)$ multi-beam beamformers can be adopted. The massive reduction on multiplication count translates to at least 20 times faster execution and/or a drastic reduction in chip area (adders will now dominate very large scale integration (VLSI) metrics) for a spatial (distributed) computing systolic-array of processors with A2A connectivity within each VSA.

In some embodiments, for simplicity, take $M = M_1 = M_2$ and $p = p_1 = p_2$. A large aperture comprising Mp×Mp grid of elements is considered to be an p×p sparse grid of M×M VSAs, each producing $M^2$ RF beams at arithmetic complexity of $M^2$ complex multiplications per time sample. A small edge processor at the sub-array level can compute the 2D AFFTs in a spatial computing approach. Each edge processor utilizes A2A connectivity at full bandwidth across its neighbors in order to realize butterfly algorithms for the 2D AFFTs. The 2D AFFTs produce $M^2$ beams at low SWaP. For the two-pair (a, b)$\in Z^2$+2D AFFT beam, for each sub-array two-pair (k, l) an angular function can be denoted in the far-field H ($\theta$, $\phi$, f, a, b). This is also shown in FIGS. 3a-3d.

Two-level beamforming between sub-arrays can be used. The level-1 beamformers can be 2D-AFFT producing a fixed-grid of $M^2$ beams per VSA. The level-2 beamformers can operate on level-1 VSA-beams. Up to $M^2$ different level-2 beamformers can be included. Level-1 beams can be presented to level-2 beamformers by invoking the "principle of pattern multiplication", which helps break-up the multi-beam problem across two levels of cascaded computation.

Let's call the q-th level-2 beamformer array-manifold function Fq $(\theta, \phi, f) \in C$ where Fq$(\theta, \phi, f)$ is as shown in the Equation 1 below, $\omega_x = \omega \sin\theta \cos\phi$ and $\omega_y = \omega \sin\theta \sin\phi$, $(\phi, \theta)$ is azimuth and elevation angles of RF beam, $\omega = 2\pi f/c$, and c is speed of light.

$$Fq(\theta, \phi, f) = \sum_{k=0}^{p-1}\sum_{l=0}^{p-1} \alpha_{k,l}(q) e^{-jM(\omega_x k + \omega_y l)} \qquad (1)$$

The level-1 VSA beams can be cascaded with the level-2 sparse array manifolds to obtain unique beam combinations having complex gain pattern (for beam 2D AFFT beam (a,b)) given as G$(\theta, \phi, f, a, b, q)$=H$(\theta, \phi, f, a, b)$Fq$(\theta, \phi, f, q) \in C$. An N-element VSA with 2D-AFFTs produces fixed beams at $\mathcal{O}(N)$, which act as combined elements to the sparse array manifold function in the level-2 adaptive beamformers. For example, minimum variance distortionless response (MVDR) or Applebaum adaptive beamformers can be used at level-2 to create the fine-grain beams across the desired angular domain within the selected level-1 beams.

Embodiments of the subject invention have the advantage of beam sharpness (set by the physical aperture size) while limiting the adaptation (covariance matrix inversion) to only level-2. Another advantage is that the complexity of the adaptive component is set by the sparse array size p×p, which is a tiny $\mathcal{O}(p6)$ (because $N^3 >> p^6$). The 2D AFFT fixed-beams can be used to constrain the problem to tight solid angles of interest within which adaptation requires the inverting of drastically smaller sized covariance matrices.

Figure 4:
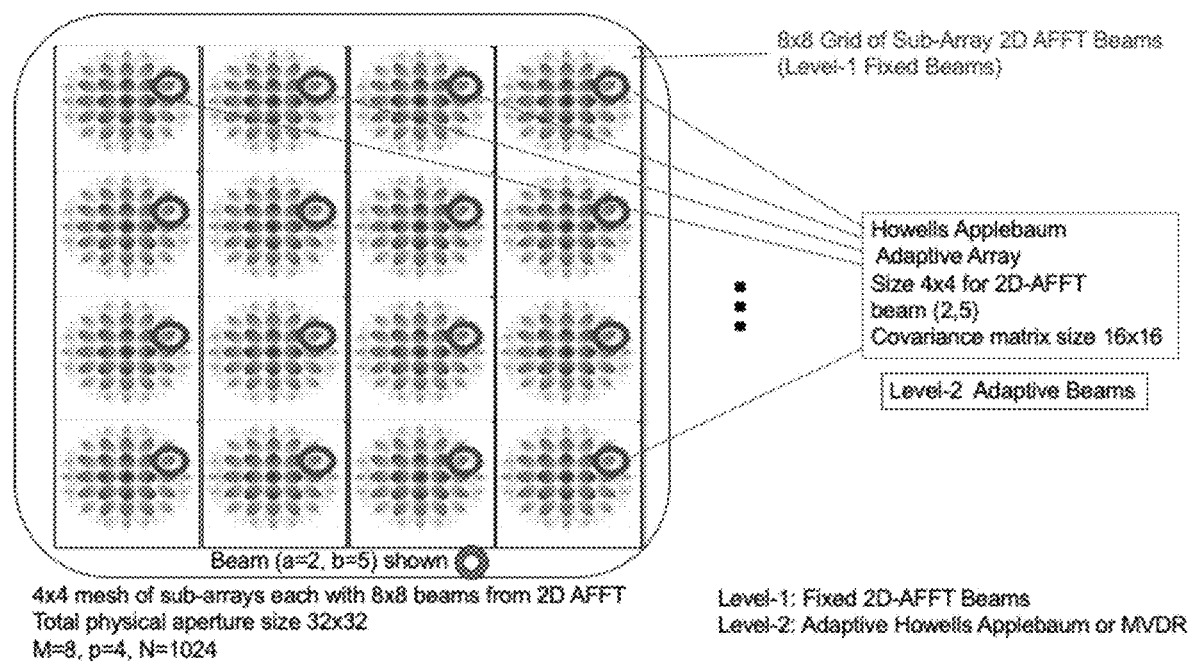
FIG. 4 shows a 4×4 mesh of sub-arrays each with 8×8 beams from two-dimensional (2D) AFFT, according to an embodiment of the subject invention. A 32×32 aperture (N=1024) can be created using a 4×4 grid of identical p×p=8×8 sub-arrays. Each sub-array (M=8) produces 64 simultaneous 2D-AFFT beams at $O(M^2)$. Each beam—(2,5) shown—is applied to a dedicated low-order adaptive beamformer (Howells Applebaum/MVDR etc.) that has complexity $O(p^6)$, where $N=M^2p^2$.

For a VSA grid of p×p that leads to a 2D transversal spatial filter of order p−1, p2−1 RFI sources can be "spatially notched-out" for a single directed optimal beam (Applebaum) within the field of view of each 2D-AFFT (level-1) RF beam. For p=4 15 RFI sources can be gotten rid of for every level-1 beam. The total number of RFI that can blanked out is $M^2(p^2-1)$, which is a large number. The absolute worst-case scenario is when $M^2$ has to be assigned different adaptive beamformers having $M^2$ different covariance matrices that require inversion, and the total complexity in this case is only $\mathcal{O}(M^2p^6)$. By taking a two-level approach, embodiments drastically reduce the complexity associated with covariance matrix inversion. The reduction is more than 99.9% for the case where the sub-arrays are 8×8 and they are organized into a 4×4 grid so that the total number of antenna elements/channels and physical aperture (directivity/gain) is still the same as a 32×32 aperture. This is demonstrated in FIG. 4.

For a typical case of a single 2D AFFT beam being used, the complexity reduces from $1024^3$ down to only $16^3$ while supporting spatial nulling of 15 RFI directions across the full 1024 element aperture with full beam sharpness intact. In order to form level-2 adaptive beams, the inputs to the q-th adaptive beamformer having coefficients $\alpha_{k,l}(q)$ can be fed from the outputs of the $p^2$ sub-arrays. Each VSA furnishes a 2D-AFFT beam (a, b) leading to vector input X(n)=[x0(n), x1(n), . . . , xp2−1(n)]. The covariance matrix is defined as $\Phi = E[X^*X^T]$, where E [.] is the expectation operator. The covariance matrix is of size $p^2 \times p^2$. The optimal weights for steering vector S is $C = \Phi^{-1}S$.

In some embodiments, the ability to compute N-beams at $\mathcal{O}(N)$ MACs is a major achievement as it is an ×log$_2$ N reduction even beyond FFT butterfly architectures that are $\mathcal{O}(N \log_2 N)$. The massive reduction of MACs come at a 1-2 dB price in sidelobe level. However, this can be greatly mitigated at the level-2 adaptive beamformer as additional RFI leakage can be spatially nulled through snapshot based adaptation. The continuous adaptation based on snapshots of the RFI environment is similar to online learning/continual learning in artificial intelligence (AI)/machine learning (ML). The VSAs are software reconfigurable and be 2×2, 2× 4, . . . , 32×32. The use of ADFT beamformers allows A2A connectivity across distributed and systolic array computing for computation of the 2D AFFTs corresponding to chosen VSA size. The fact that the AFFTs only need less than 8-bits of precision allows energy-efficient computational methods from AI/ML acceleration world to be ported to beamforming. Level-1 beamformers (linear/square/circular) can be realized using FPGAs and/or digital ASIC (see also; Ariyarathna et al., Circular array n-beam digital beamformer having low arithmetic complexity: 16 simultaneous 100 MHz beams at 2.4 GHz, IEEE Transactions on Radar Systems, vol. 1, pp. 318-324, 2023; which is hereby incorporated by reference herein in its entirety). Level-2 beamformers require 32 bits of numerical precision due to matrix inversion and associated numerical stability; these can be initially realized using FPGAs (32-bit fixed-point).

As alternatives to level-1 fixed 2D AFFT beams, low-complexity adaptive beamforming at Level-1 can be used. That is, both level-1 and level-2 can be Applebaum beamformers. This complexity of matrix inversions applies to M×M arrays for level-1, with complexity $\mathcal{O}(p^2M^6)$ which is still significantly smaller than the A2A case of $\mathcal{O}(p^6M^6)$. This is because there would then be $p^2$ number of VSAs each having $M^2$ elements. The 2-level Applebaum algorithm must be updated in two stages. The update algorithm is as follows:

For k=1 to $p^2$ do for each VSA number k: measure N$_t$ number of temporal snapshots across the $M^2$ elements of every VSA. That is, there will be $p^2$ sets of snapshots. These snapshots lead to $p^2$ sets of covariance matrices Ck, k=1, 2, . . . , $p^2$ where each covariance matrix is of size $M^2 \times M^2$.

Once the ensemble average of the covariance matrices over N$_t$ snapshots are found, find the inverses of each covariance matrix. Because there are $p^2$ covariance matrices to invert, and each inversion is complexity $\mathcal{O}(M^6)$, the total complexity for matrix inversion is $\mathcal{O}(p^2M^6)$.

Once the matrices have been inverted, the Applebaum algorithm can be applied to find the optimum weights for the desired look direction for all $p^2$ VSAs. This completes the level-1 adaptation.

In level-2 adaptation, another N'$_t$ number of snapshots must be obtained across the beams provided by level-1, leading to a single covariance matrix P. Once the ensemble average of N'$_t$ snapshots from the outputs of the $p^2$ level-1 Applebaum beamformers are found, the matrix inversion for level-2 is of complexity $\mathcal{O}(p^6)$. Once the covariance matrix of level-2 snapshots is done, the level-2 beamforming weights can be computed via the Applebaum method. The total number of time steps, of snapshots measured sequentially, is Nt+N'$_t$ as the $p^2$ sets of snapshots at level-1 happen concurrently across the VSAs.

DFT-based beamformers provide N beams with a uniform linear array having N antennas. Despite low-complexity, related art DFT beamformers cannot generate deep nulls at arbitrary directions of arrivals (DOAs) in the beam pattern to attenuate interferences. Data-dependent adaptive beamformers can achieve deep nulls at arbitrary DOAs, but at higher complexity due to an inversion of a matrix in deriving optimum weights. Embodiments of the subject invention provide combined ADFT and adaptive beamformers for uniform linear arrays comprising P subarrays, each having M antennas. First, P ADFT beamformers can be employed to process signals received by subarrays, and the P outputs of these subarrays (after processing by the ADFT beamformers) can then be processed by an adaptive beamformer. Simulation results confirm that the beamformer provides the benefits of both DFT and adaptive beamformers, and preliminary results of an experimental antenna array operating at 5.75 gigahertz (GHz) are presented, where a Howells-Applebaum beamformer (implemented in a field programmable gate array (FPGA)) is employed as the adaptive beamformer (see the examples).

Active electronically scanned apertures (AESAs) are crucial in multifunctional arrays, especially in phased-array radar, wireless communications, microwave imaging, and electronic warfare applications. Multibeam multifunctional AESAs are necessary as they support multiple simultaneous use cases and visibilities across several directions and waveforms. DFT-based multi-beam beamformers provide N beams with a uniform linear array (ULA) having N antennas. Even though DFT beamformers have low computational complexity, thanks to FFT algorithms, they cannot generate deep nulls at arbitrary DOAs in the beam pattern to attenuate radio frequency interferences (RFIs). While data-dependent adaptive beamformers can achieve deep nulls at arbitrary RFI DOAs, but at higher complexity due to an inversion of a matrix in deriving optimum weights. The computational complexity of an inversion of an N×N matrix associated with an N-antenna ULA is $O(N^3)$. This complexity is exorbitantly high to process signals in real time for extremely large arrays that are employed in 6G and beyond wireless communication systems and electronic warfare applications.

Embodiments of the subject invention provide combined ADFT and adaptive beamformers for large ULAs. The ULA having N antennas can be divided into P subarrays, each of which has M antennas. Note that N=PM. Here, P ADFT beamformers can first be employed to process signals received by subarrays. Then, the P outputs of these subarrays can be processed by an adaptive beamformer, such as Howells-Applebaum, MVDR, linearly constrained minimum variance (LCMV), or other robust adaptive beamformer. By employing ADFT, the computational complexity of a DFT beamformer can be reduced from $O(M \log(M))$ to $O(M)$. More importantly, the approach can lead to an extremely high computational reduction in the matrix inversion operation of an adaptive beamformer, from $O(M^3P^3)$ to $O(P^3)$. Simulation results generated for a 128-antenna ULA (M=32 and P=4) that receives two RFIs in addition to the signal of interest (SOI) verify that the beamformer provides the benefits of both ADFT and adaptive beamformers. That is, the beam pattern of the beamformer has nulls at the DOAs of the RFIs, and provides 32768 times reduction in computational complexity in deriving the adaptive beamformer weights compared to an adaptive only beamformer when M=32 and P=4.

The DFT is an important tool in signal processing and communications. It includes a linear transformation capable of mapping a given N-point discrete-time signal $x=[x[0] \ x[1] \ \ldots \ x[N-1]]^T$ into its corresponding frequency-domain representation $X=[X[0] \ x[1] \ \ldots \ X[N-1]]^T$ according to the matrix relation $X=F_N x$, where $F_N$ is the DFT matrix whose entries are given by $f_{k,n}=\exp(-j2\pi kn/N)$, for k, n=0, 1, ..., N-1; and $j \equiv \sqrt{-1}$. The direct evaluation of the DFT has multiplicative complexity in $O(N^2)$, making it unfeasible for real-time processing. FFTs, a collection of algorithms for computing the DFT, reduce the computational complexity to $O(N \log N)$.

For AESAs, FFTs do not provide computation under competitive time-complexity levels. DFT approximations pave the way for (i) mitigating the computational complexity to levels lower than the theoretical minimum for the exact DFT computation and (ii) providing spectral estimation whose errors are comparable to the intrinsic error effected by the overall system error floor (therefore, potentially undetectable). An N-point DFT approximation is an N×N matrix $\hat{F}_N$ that (i) shares desirable mathematical properties of the exact DFT matrix and (ii) includes trivial-multiplicand entries, such as $\{0, \pm1, \pm2\}$. Trivial multiplicands are numbers that when realized in hardware do not require the multiplication algorithm, thus resulting in multiplierless operations.

Figure 5A:
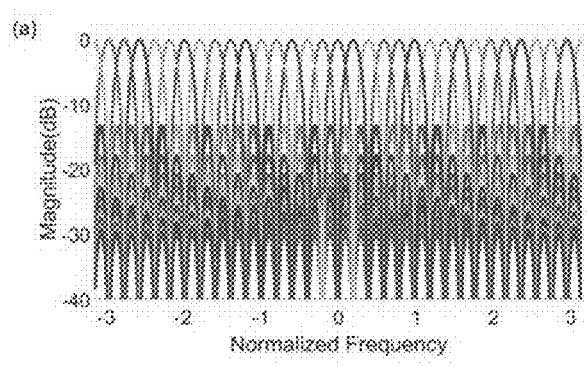
FIGS. 5a and 5b show plots of magnitude (in dB) versus normalized frequency, showing simulated frequency responses of 32 output bins for a 32-point exact DFT (FIG. 5a) and a 32-point ADFT (FIG. 5b).
Figure 5B:
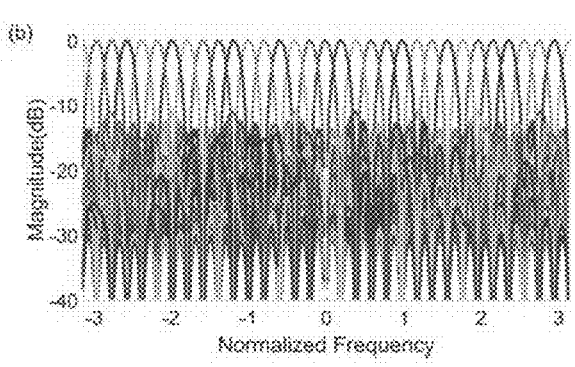

FIGS. 5a and 5b show the results for ADFT magnitude responses. The ADFT preserves the main lobes and has side lobes under −15 dB, which makes it suitable for radio frequency applications. Here, the N-point spatial ADFT, computed for each time frame in an N-element ULA, provides N nearly-orthogonal beams in the effective array pattern. ADFT submits simultaneous directional reception of radio waves allowing multi-beam beamforming. The use of a spatial ADFT lowers the hardware complexity leading to zero multipliers at the cost of about 2 dB degradation in directivity.

Adaptive beamformers in the digital domain typically take the form of a filter-and-sum system architecture where a finite impulse response (FIR) filter is employed at each antenna whose outputs are subsequently summed across the array to obtain the final beamformed output. Here, the coefficient of the FIR filters at each antenna are obtained by a data-driven approach, following numerous optimization criteria on the array covariance matrix $R_x = \mathbb{E}[xx^H]$ to minimize the overall signal to noise and interference ratio, where x denotes the received array signal. Typical algorithms to obtain such adaptive coefficients include Howells-Applebaum, MVDR, LCMV, and robust adaptive beamformers. Such adaptive beamformers can be employed to insert deep nulls in the beam pattern that corresponds to the DOAs of high power jamming RFIs. In deriving coefficients of these adaptive beamformers, in general, a matrix should be inverted. For example, coefficients of a Howells-Applebaum beamformer is given by $w_{HA}=R^{-1}a$, and those of an MVDR beamformer are given by $w_{MVDR}=(a^H R^{-1} a)^{-1} R^{-1} a$, where a is the steering vector.

FIG. 1 shows the architecture of a beamformer according to an embodiment of the subject invention. The MP-antenna ULA can be divided into P subarrays, each containing M antennas. It can be assumed that the inter-antenna distance d satisfies the Nyquist condition so that no grating lobes exist. An M-element ADFT beamformer can be employed for each subarray. The ADFT beamformer is a multiple-input multiple-output system that generates M beams. The ith output ($1 \leq i \leq N$) corresponds to the ith beam. The P outputs corresponding to each beam are then processed with an adaptive beamformer. For the adaptive beamformer, input signals corresponds to a P-element array of which inter-antenna distance is Md. Therefore, the input signal is undersampled, and M−1 grating lobes exist in the beam pattern in addition to the main beam. However, these grating lobes lie outside the main beam of the ADFT beamformer. Therefore, these grating lobes are attenuated to the sidelobe level of the ADFT beamformer. The overall beam pattern $H'(\theta, f)$, of the beamformer corresponding to the to the ith beam (1≤i≤N) of the ADFT beamformer is given by $$H^i(\theta,f) = H_D^i(\theta,f) H_A(\theta,f), \quad (1)$$

where $H_D^i(\theta, f)$ is the beam pattern corresponding to the ith beam of the ADFT beamformer, $H_A(\theta, f)$ is the beam pattern of the adaptive beamformer, $\theta$ is the elevation angle, and f is the temporal frequency.

Real-time sensing and perception of the radio spectrum based on artificial intelligence (AI) is crucial for emerging intelligent wireless and electronic warfare systems. However, sensing can be greatly impacted by harmful RFI. Emerging drone warfare allows many RFI sources/jammers to be distributed across a wide field-of-view, which necessitates real-time measurement, adaptation, and aperture nulling to remove the RFI before AI-based sensing and perception of sources of interest can occur. Embodiments of the subject invention can improve the computational complexity of the classical Howells-Applebaum adaptive nulling algorithm to enable fast, real-time adaptive operation at significantly lower arithmetic complexity. Design examples for AI-enabled sensing and perception across a 32-element antenna receiver with 32 independent channels and a Xilinx Virtex-6 Sx475 FPGA backend are presented in the examples, which show computer architecture for digital signal processing and AI algorithms operating on the FPGA, with real-time measurements for spectrum sensing and modulation recognition on the RadioML2018.a dataset with and without the adaptive null-forming system. A general adversarial AI-based spectrum perception architecture that allows both jamming of opponents while simultaneously nulling out RFI and conducting AI-based radio intelligence applications is considered and demonstrated in the 5.7 GHz to 5.8 GHz band using a 32 element real-time FPGA realization; and modulation recognition is demonstrated for 16/32-QAM signals under heavy RFI conditions with additional "in the wild" RFI sources present (see the examples).

Towards maintaining superiority in the spectrum domain under massive scale jamming, a microwave-digital multichannel spectrum sensing and AI-perception testbed can be used that allows active jamming and RFI mitigation both at the same time, while delivering low-latency spectrum intelligence via perception using machine learning (ML) methods. Via the testbed, a low-complexity adaptive beamformer can be employed that is an improvement of the Howells-Applebaum adaptive beamformer. The adaptive beamformer can reduce complexity of null formation by taking a multi-level approach to adaptation, which enables smaller arithmetic complexity levels for null adaptation. Support for active RF jamming can be provided at the sensor location via self-interference subtraction in real-time. A range of state-of-art signal sensing and AI/ML-based waveform classification algorithm can be provided, operating at the backend. The self-interference cancellation can allow active jamming of an opponent's spectrum sensors and receivers. Low-complexity adaptive beamformers can allow fast, low-latency, and low-arithmetic complexity null-formation using multi-level Howells-Applebaum adaption across sub-arrays. AI/ML perception can operate on the null-formed and interference-canceled "clean" received signals that also exhibit beamforming gain that improves the signal to noise ratio (SNR). Processing of cross-correlation based location, direction-finding, spectrum occupancy, joint-time frequency domain (spectrogram) based pattern of life (POL) analysis, modulation recognition, and other AI/ML algorithms for low-SNR RF environments can be demonstrated.

AI algorithms in the radio access network (RAN) offer much potential for data-driven and ML based real-time operation of the air interface in emerging 5G/6G and NextG wireless networks. However, data-driven AI/ML systems can be very sensitive to perturbations in the input signals during post-training operation (that is, inference mode). The presence of unknown RFI sources mixed in with the signals of interest cause many AI/ML algorithms operating on pre-trained weights in their neural network architectures to undergo catastrophic failure. Further, certain types of adversarial attacks that insert malicious RF waveforms into the wireless environment may cause AI/ML algorithms to fail. Therefore, the ability (as with embodiments of the subject invention) to efficiently null out RFI sources before the received signals are sent to the AI/ML perception stages of the system is of high practical utility in real-world environments where RFI cannot be controlled as in lab conditions.

As a review of Howells-Applebaum beamformer, consider a ULA of N antennas. The ULA receives a signal of interest having a direction of arrival (DOA) $\theta_0 \in [-90°, 90°]$ and multiple (less than N−1) RFIs having DOAs different from $\theta_0$. It can be assumed that both the signal of interest and the RFIs are wide-sense stationary narrowband plane waves. The signals received by a ULA are first processed via RF chains having LNAs, filters, and mixers before synchronous conversion using ADCs, and are subsequently fed to the beamformer. The input signal to the beamformer at a time instant can be denoted as $x=[x(0), x(1), \ldots, x(N-1)]^T$, where $x(k)$, $0 \le k \le (N-1)$ is the discrete-time signal corresponding to the kth antenna. The weight vector of a beamformer can be denoted as $w=[w(0), w(1), \ldots, w(N-1)]^T$. Note that x, $w \in \mathbb{C}^N$, and it can be assumed that antennas have identical radiation patterns and the distortion introduced by RF chain the ADCs are negligible or compensated.

In the Howells-Applebaum beamformer, the weights are selected to maximize the SNR. In this case, the optimal weight vector $w_o$ is computed as $$w_o = R^{-1} a, \quad (2)$$

where $R = \mathbb{E}\{xx^H\} (\in \mathbb{C}^{N \times N})$ is the covariance matrix, $\mathbb{E}\{\cdot\}$ denotes the expectation, and $(\cdot)^H$ denotes Hermitian (conjugate transpose) of a matrix. Further, $a=[1, e^{j\omega_0 \tau}, \ldots, e^{j(N-1)\omega_0 \tau}]^T \in \mathbb{C}^N$ is the steering vector, where $\omega_0 (\in [-\pi, \pi)$ rad/sample) is the discrete-domain angular frequency of the narrowband signal of interest. Here, $\tau = d \sin(\theta_0)/c$, where d is the inter-antenna distance and c is the speed of the electromagnetic plane waves. In practice, R is estimated using a set of temporal samples (snapshots) because the signals represent wide-sense stationary processes. The output y of the beamformer is given by $$y = w_o^H x. \quad (3)$$

Figure 8:
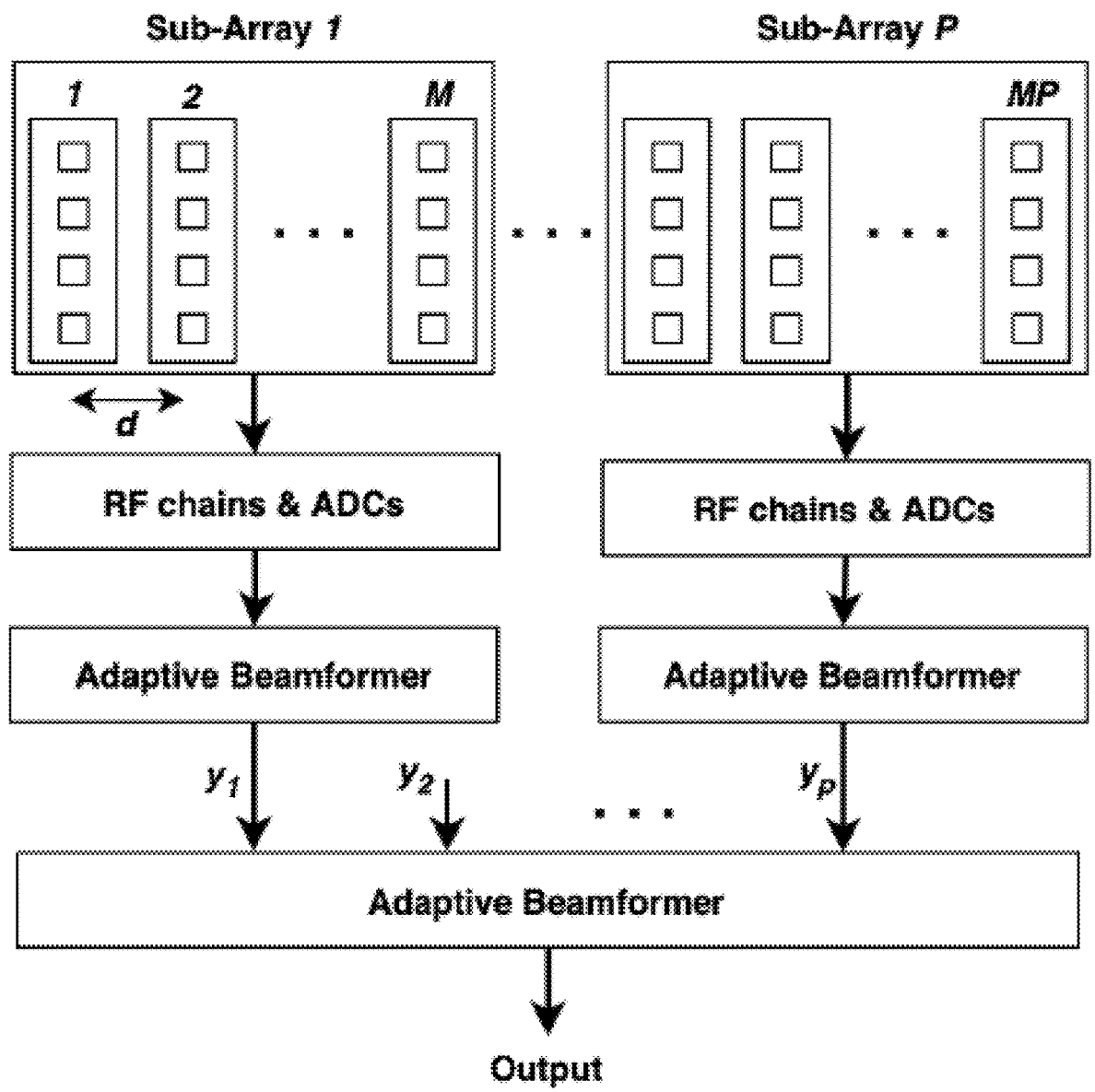
FIG. 8 shows the architecture of a hierarchical Howells-Applebaum adaptive beamformer, according to an embodiment of the subject invention.
Figure 9:
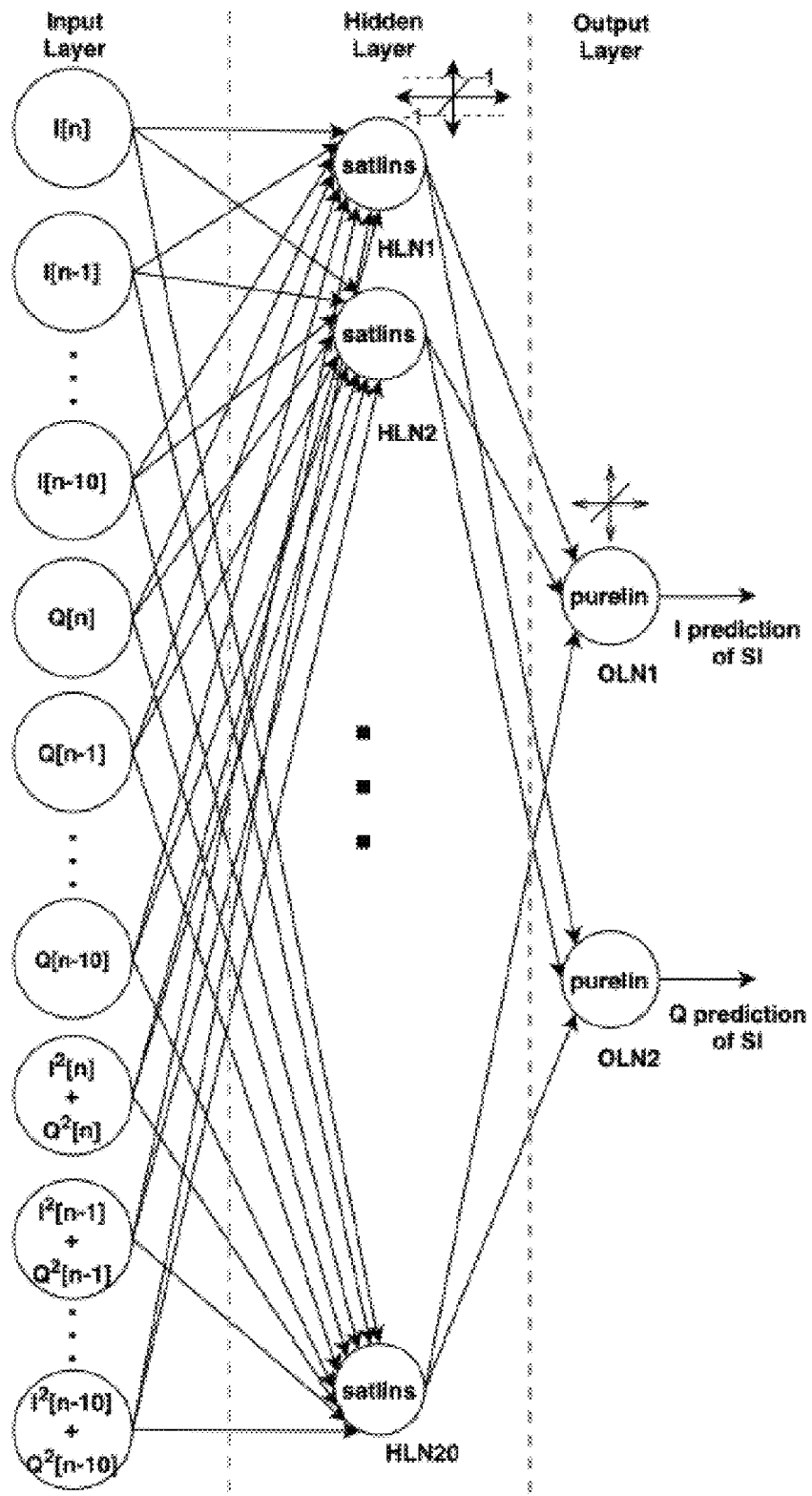
FIG. 9 shows a block diagram of a time delay neural network (TDNN) core that can predict self-interference when a transmit signal is fed as input. This core can be realized in software for offline processing.

FIG. 8 shows the architecture of a hierarchical Howells-Applebaum beamformer, according to an embodiment of the subject invention, and FIG. 9 shows a block diagram of a time delay neural network (TDNN) that can be used with embodiments. Referring to FIG. 8, the MP-antenna ULA (where N=MP) is divided into P subarrays. Each subarray comprises M antennas with identical radiation patterns. Note that the inter-antenna distance d is selected so that the Nyquist condition is satisfied and there are no grating lobes in the beam pattern. In the hierarchical architecture, Howells-Applebaum beamformers can first be employed for each subarray. The input and the optimum weight vector of the pth subarray ($1 \le p \le P$) can be denoted as $x_p$ and $w_{o,p}$, respectively. Then the output $y_p$ of the pth subarray can be expressed as $$y_p = w_{o,p}^H x_p, \quad (4)$$

Then these outputs $y_p$ (1≤p≤P) can be considered as the input to the second Howells-Applebaum beamformer. In this case, the beam pattern of the overall hierarchical beamformer $H(\theta, \omega_o)$ can be expressed as $$H(\theta,\omega_o)=H_1(\theta,\omega_o)H_2(\theta,\omega_o), \quad (5)$$

where $H_1(\theta, \omega_o)$ and $H_2(\theta, \omega_o)$ are the beam patterns of the subarray Howells-Applebaum beamformer, and the second Howells-Applebaum beamformer, respectively, $\theta$ is the elevation angle, and $\omega_o$ is the discrete-time angular frequency of the signal of interest. Here, it can be assumed that P subarray Howells-Applebaum beamformers have the identical beam patterns.

Note that $y_1$ to $y_p$ can be considered as the inputs from a ULA comprising P antennas with inter-element distance Md. Therefore, the input signal can be spatially under-sampled, and M−1 grating lobes exist in the beam pattern $H_2(\theta, \omega_o)$ in addition to the main beam. However, these grating lobes can be attenuated in the overall beam pattern $H(\theta, \omega_o)$ because the grating lobes are in the side lobes of the $H_1(\theta, \omega_o)$.

Figure 10:
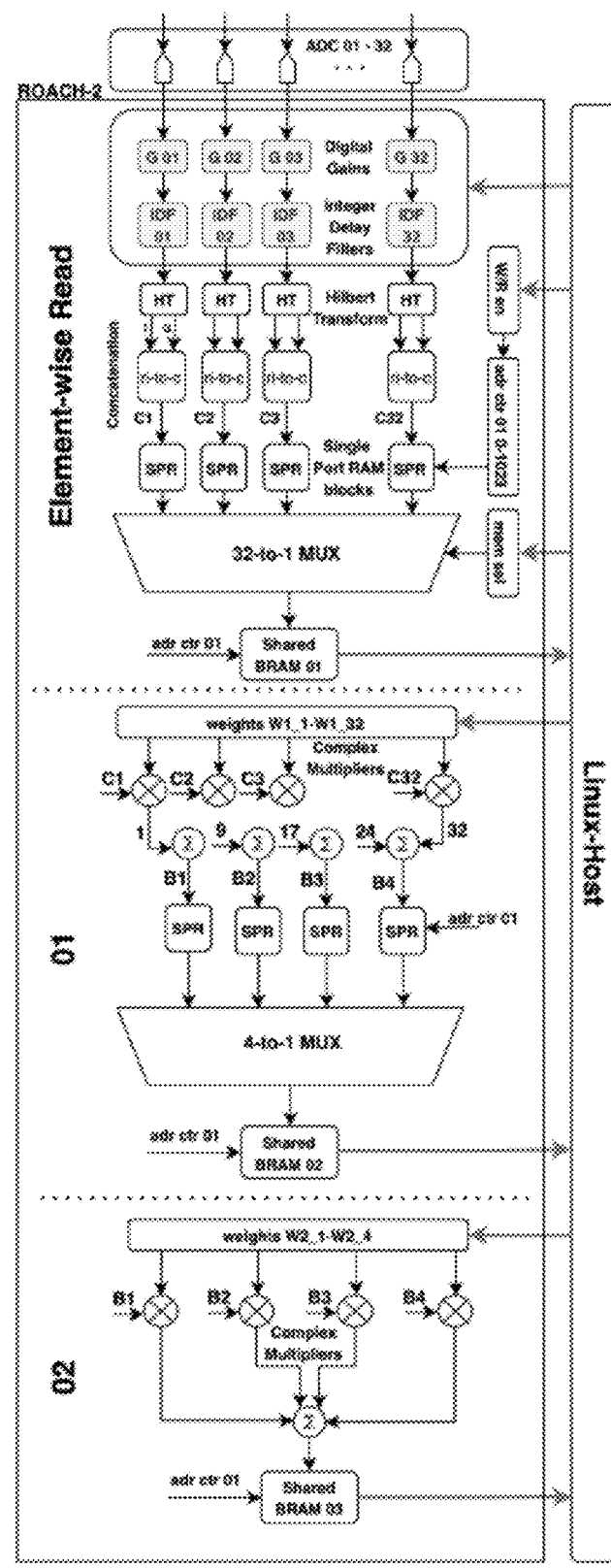
FIG. 10 shows the digital architecture for a 32-channel receiver with hierarchical Howells-Applebaum adaptive beamforming. The field programmable gate array (FPGA) processing can occur on, for example, a Virtex-6 Sx-475 device installed on a ROACH-2 platform with CASPER open source blocks for standard functions such as ethernet and BRAM access. The architecture can be realized on FPGA and is operational in real-time.

FIG. 10 shows the digital architecture of a 32-channel receiver with hierarchical Howells-Applebaum adaptive beamforming, according to an embodiment of the subject invention. Referring to FIG. 10, the 32 elements of the ULA can be divided into four subarrays. Nulls can be formed at two levels, starting with 8-element 4 subarrays and resulting 4 output beams, progressively refining the beamforming performance. When calculating the beamforming weights for Level 1 and Level 2, the element spacing is carefully considered, and interleaved spacing can be applied accordingly. This can ensure that the hierarchical beamforming process properly aligns the subarray elements to optimize spatial filtering and interference suppression. For Level 1, weights can be determined based on the element spacing within each 32-element array. At Level 2, the 4 output beams can be combined as 4-element and 8 times the inter-element distance as the 32 element ULA. The design can utilize 1024 samples of the beamformed signal, which can be obtained after the complex adders and multipliers. These samples can then be written into 1024 addresses of the shared BRAM 03, as depicted in FIG. 10.

Embodiments of the subject invention provide a focused technical solution to the focused technical problem of how to reduce the computational complexity and A2A communication within VSAs. The solution is provided by realizing scalable algorithms for digital array computations using architectures that scale to extremely large aggregate data rates, while enabling distributed parallel edge processing, as discussed in detail herein.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, combinations and subcombinations of ranges (e.g., any subrange within the disclosed range) and specific embodiments therein are intended to be explicitly included. When the term "about" is used herein, in conjunction with a numerical value, it is understood that the value can be in a range of 95% of the value to 105% of the value, i.e. the value can be+/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Simulation results were obtained to confirm the effectiveness of the beamformer shown in FIG. 1. A ULA was considered, comprising 128 isotropic antennas (M=32 and P=4) operating at 5.75 GHz. A case was considered where two RFIs are received by the ULA in addition to the SOI. The DOAs of the signal of interest were selected as 30°, and the DOAs of the two RFIs were selected as 28° and 32°. Note that the DOAs of RFIs are very close to that of the SOI. For the beamformer, a 32-element multi-beam ADFT beamformer (for each subarray) was employed, and a 4-element MVDR beamformer was employed as the adaptive beamformer. The SOI and the RFIs have similar power, and additive white Gaussian noise was employed with $\sigma=10^{-5}$.

Figure 6A:
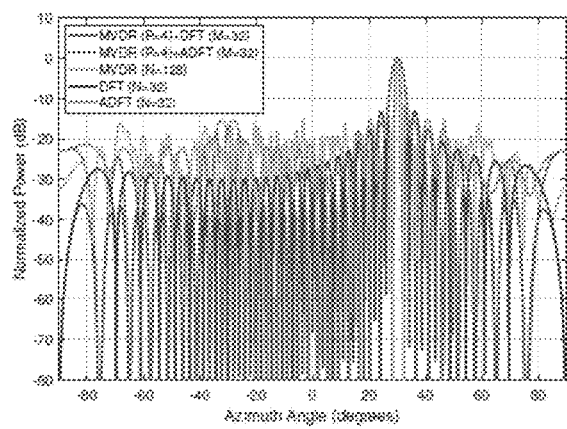
FIG. 6a shows a plot of normalized power (in dB) versus azimuth angle (in degrees), showing beam patterns of different beamformers considered in a simulation.
Figure 6B:
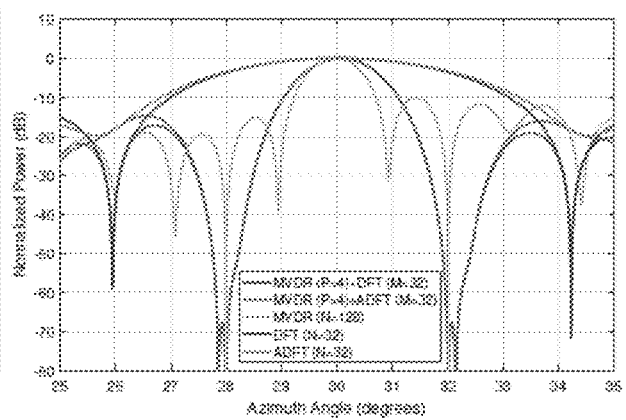

The following beamformers were also designed, in addition to the beamformer of FIG. 1, for the case considered above: 32-element DFT; 32-element ADFT; 128-element MVDR; and combined 32-element DFT and 4-element MVDR. The beam patterns of the five beamformers are presented in FIGS. 6a and 6b, with "MVDR (P=4)+ADFT (M=32)" representing the beamformer of FIG. 1. The DOA of the SOI corresponds to the 9th beam of the 32-element DFT and ADFT beamformers, and the beam pattern corresponding to this beam is presented. The 32-element DFT and ADFT beamformers cannot generate nulls at the DOAs of the two RFIs because these DOAs are within the main beam of these two beamformers. On the other hand, the combined ADFT and MVDR of FIG. 1 provides nulls at the DOAs of the two RFIs. Compared to the MVDR beamformer, the approach of the beamformer of FIG. 1 provides a 1283/43=32768 times reduction of the computational complexity in the matrix inversion associated with the MVDR beamformer. Further, the beamformer of FIG. 1 provides a reduction of computational complexity from O(M log (M)) to O(M) compared to the combined DFT and MVDR beamformer. These results verify that the beamformer of FIG. 1 provides beam patterns similar to MVDR and combined DFT and MVDR while providing a significant reduction in computational complexity.

Example 2

Towards eventual realization of the combined ADFT and adaptive beamformer, a 32-channel fully-digital Howells-Applebaum adaptive beamformer was designed and implemented at 5.8 GHz. The experimental setup features a ULA of subarrays, each comprising four patch antenna elements, arranged in a 4× 32 aperture with 32 channels, where the inter-element spacing was 30 mm (0.58λ at 5.8 GHZ). There are 32 degrees of freedom with direct-conversion receivers that operate at the intermediate frequency (IF) range of 0 megahertz (MHz) to 100 MHz. Each receiver was sampled at 200 MHz using 32 parallel analog to digital converters (ADCs) that were interfaced to a Xilinx Virtex-6 Sx475T FPGA on a ROACH-2 digital signal processing platform.

Each antenna element of the antenna array was connected to a dedicated receiver chain, custom designed on printed circuit boards (PCBs). The first stage of each receiver chain included a low-noise amplifier providing 16 dB of gain at 5.75 GHZ, followed by a bandpass filter with a 4.7 GHz to 6 GHz range to mitigate out-of-band noise and interference. The amplified and filtered signals were then mixed with a local oscillator (LO) signal and passed through lowpass filters to produce down-converted low IF signals. A centralized low-phase-noise LO system, featuring with a 32-output power divider network, supplied the LO signal to each receiver. The 32 down-converted low-IF signals were then amplified by approximately 30 dB before being digitized.

The ROACH-2 platform was used to sample the IF signals. The ROACH-2 platform was equipped with a Xilinx Virtex-6 SX475T FPGA, which was integrated with two ADC cards, each supporting 16 single-ended input channels, offering 8-bit resolution, and operating at sampling rates up to 250 million of samples per second (MS/s) per channel. ROACH-2 served as the digital signal processing interface between the FPGA and the host system. The digital architecture of the Howells-Applebaum adaptive beamformer was facilitated by a 1 gigabit per second (Gbps) PowerPC link, which provided shared registers between the FPGA fabric and the ROACH-2 control fabric (software registers), enabling robust communication between the FPGA and the server. A Python routine running on a Linux server managed the control and operation of the FPGA.

The system calibration process included two distinct phases. Initially, the design was programmed onto the FPGA, after which the ADCs were activated and calibrated using Ruby scripts from the CASPER community. Following this, digital fine-calibration of the ADC output streams was performed. The jamming signals were transmitted using two double-ridge guided horn antennas and a 4×1 patch antenna sub-array A 5.89 GHz sinusoidal signal at 15 decibels-milliwatts (dBm) power was transmitted from each antenna, positioned at distinct bearings 20 meters (m) apart. The local oscillator frequency ($f_{LO}$) was set to 5.88 GHZ, yielding a 10 MHZ intermediate frequency, with the digitized outputs clocked at $f_{CLK}$=200 MHz.

After capturing RFI snapshots, the optimal weight vector was computed using the Howells-Applebaum method on a Linux host, and the calculated weights were loaded into the ROACH-2 software registers. The beam patterns were generated by transmitting a continuous-wave signal from a horn antenna at broadside (0°) at a distance of 20 m from the receiver array on an open parking deck.

Figure 7A:
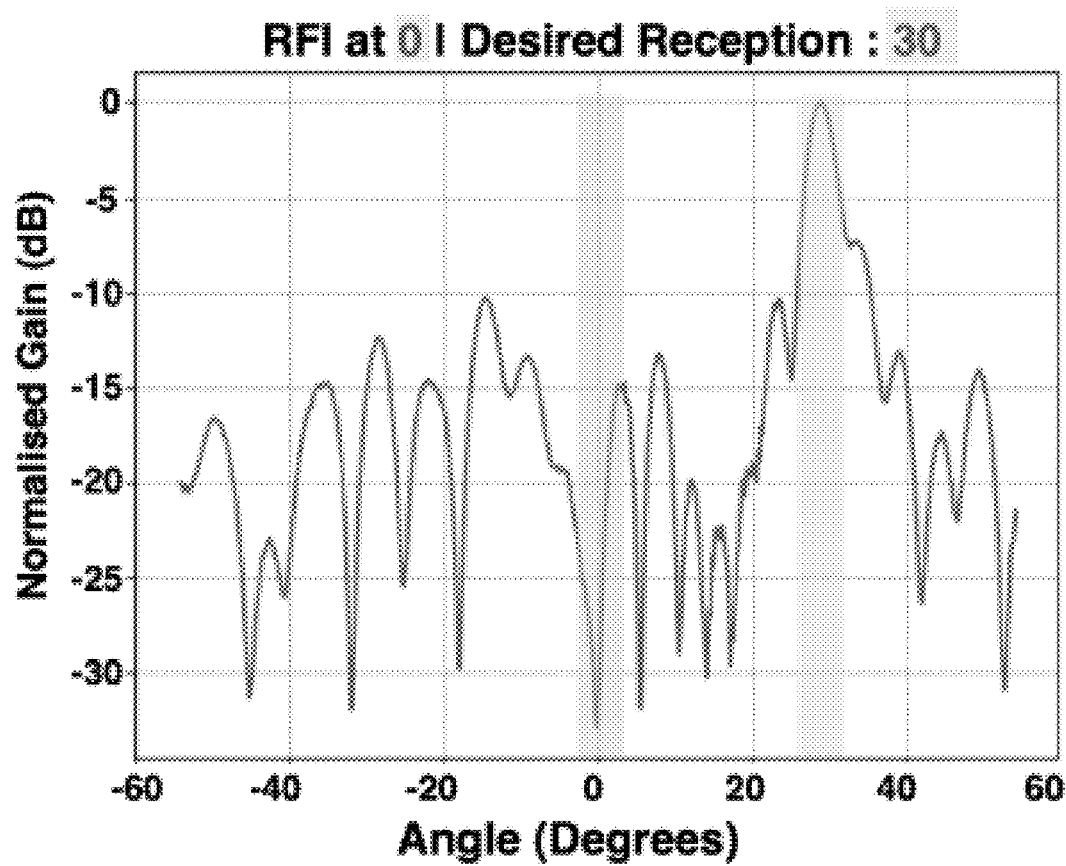
FIG. 7a show plots of normalized gain (in dB) versus angle (in degrees), showing measured beam patterns for one radio frequency interference (RFI) (FIG. 7a) at 0 degrees and two RFIs (FIG. 7b) at 0 degrees and 10 degrees from a real-time 32-channel adaptive aperture. Nulls are normally 30 dB below the main lobe.
Figure 7B:
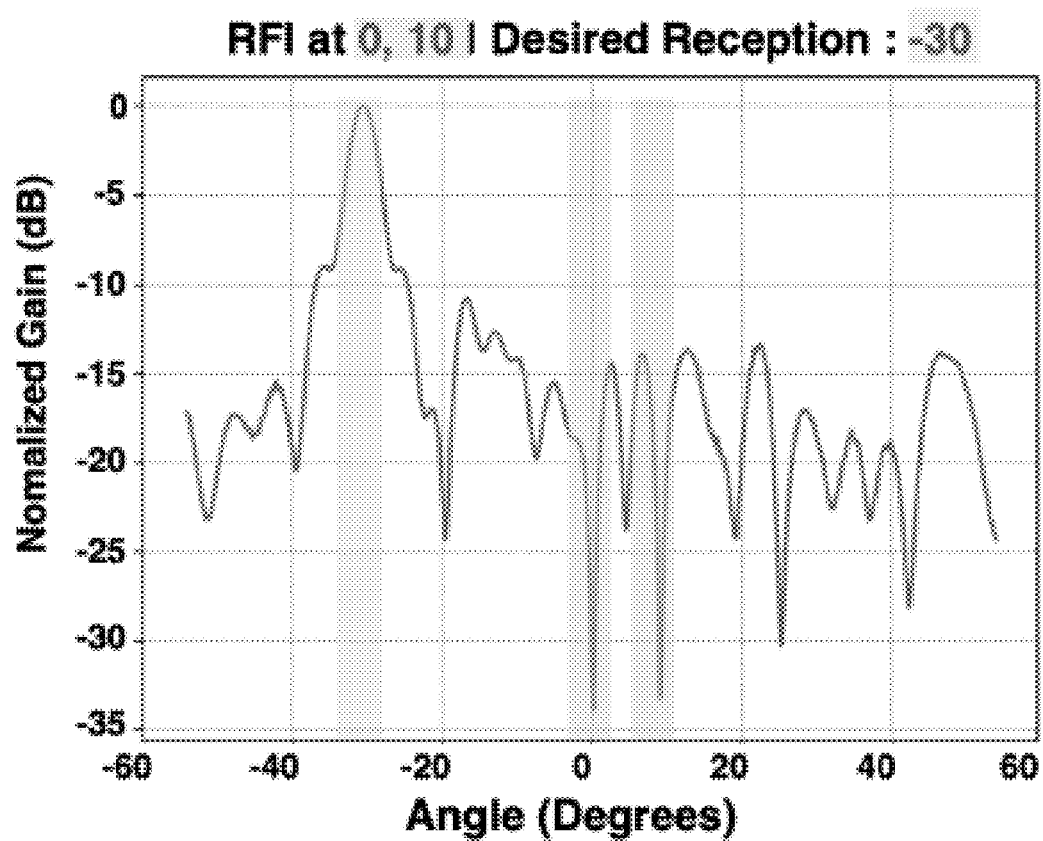

FIGS. 7a and 7b illustrate the measured array factors for different RFI placements, showing peaks at predefined beam-steering angles with a directivity of 10 dB against the highest side-lobe. Nulls of approximately 35 dB depth were observed at the RFI angles, with effective suppression for both the one- and two-RFI scenarios.

Examples 1 and 2 show that the low-complexity beamformer, which combines an ADFT and an adaptive beamformer, drastically reduced the computational complexity (i.e., $O(M^3P^3)$ to $O(P^3)$) compared to an adaptive beamformer, while maintaining the advantageous properties of an adaptive beamformer. Simulation and experimental results verified the superior performance of the approach.

Example 3

Figure 11A:
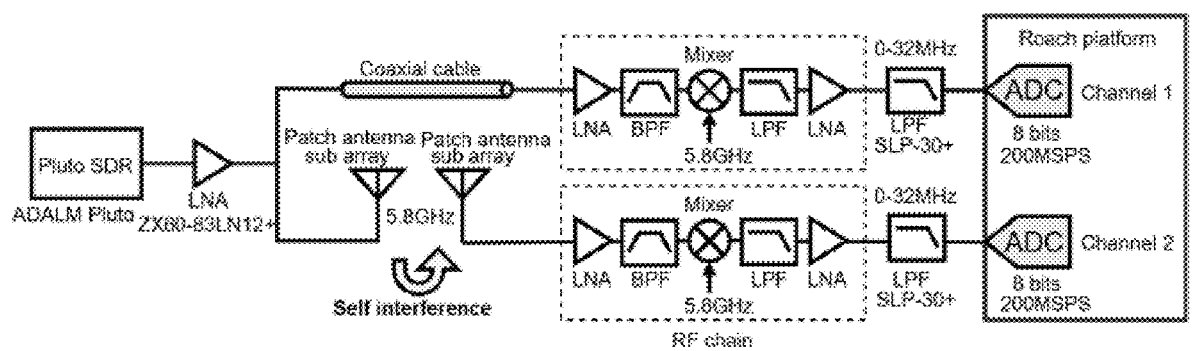
FIG. 11a shows a block diagram of a testbed used for data collection.

ML-based interference cancellation of self-jamming was investigated. The experimental setup included two channels for collecting training data for the neural network. As shown in FIG. 11a, the input data was gathered through a wired channel, while the corresponding output data was obtained from the self-interference channel. The data collection process utilized a Pluto SDR as the transmitter and a ROACH2 platform as the receiver. The Pluto SDR was configured to continuously transmit a QPSK waveform including 2000 arbitrary symbols. Before being fed into the wired channel and the self-interference channel, the waveform was amplified using a low-noise amplifier (Mini circuits ZX60-83LN12+).

The self-interference (SI) channel was modeled by positioning two patch antenna subarrays in close proximity with one acting as the transmitter and the other as the receiver. The coupled signal passed through the RF front end before being sampled by the ROACH platform's 8-bit ADC at 200 MHz. Each patch antenna subarray was a single element of custom made antenna array, which was connected to the RF front end. To capture only the characteristics of the self-interference channel, the wired channel also went through the same RF front end before reaching the ADC. Both channels were filtered using a Mini-Circuits SLP-30+lowpass filter to band-limit the signals.

The dataset used to train the neural network included I and Q values from 10,000 samples of a QPSK-modulated signal. To achieve better cancellation performance, the signal envelope was included as an input to the network along with I sample values and Q sample values. For efficient hardware implementation, the envelope variant used in the model was the squared sum of the I and Q samples, given by $v(n)=I^2(n)+Q^2(n)$ as the computationally costly square-root operation associated with the envelope function $\sqrt{v(n)}$ could then be avoided. The neural network contained a single layer of a time delay neural network with 20 neurons per layer with a memory length of 10. Activation used in the layer was saturating linear unit (satlins). The collected dataset was divided into a 85:15 ratio for training and testing, and MATLAB's Deep Learning Toolbox was employed for the simulated implementation.

The performance of the neural network was evaluated by calculating the normalized squared error (NSE) on the test set. Let the test sequence (ideal) be $y_{test}(n)=I_{test}(n)+jQ_{test}(n)$ and the AENN predicted samples be $y_{predicted}(n)=I_{predicted}(n)+jQ_{predicted}(n)$ for time-sample n. The associated error in the complex plane, which is a function of n, is γ(n) where $$\gamma(n) = 10 \cdot \log_{10}\left(\frac{|y_{test}(n) - y_{predicted}(n)|}{|y_{test}(n)|}\right)^2. \quad (6)$$

Figure 11B:
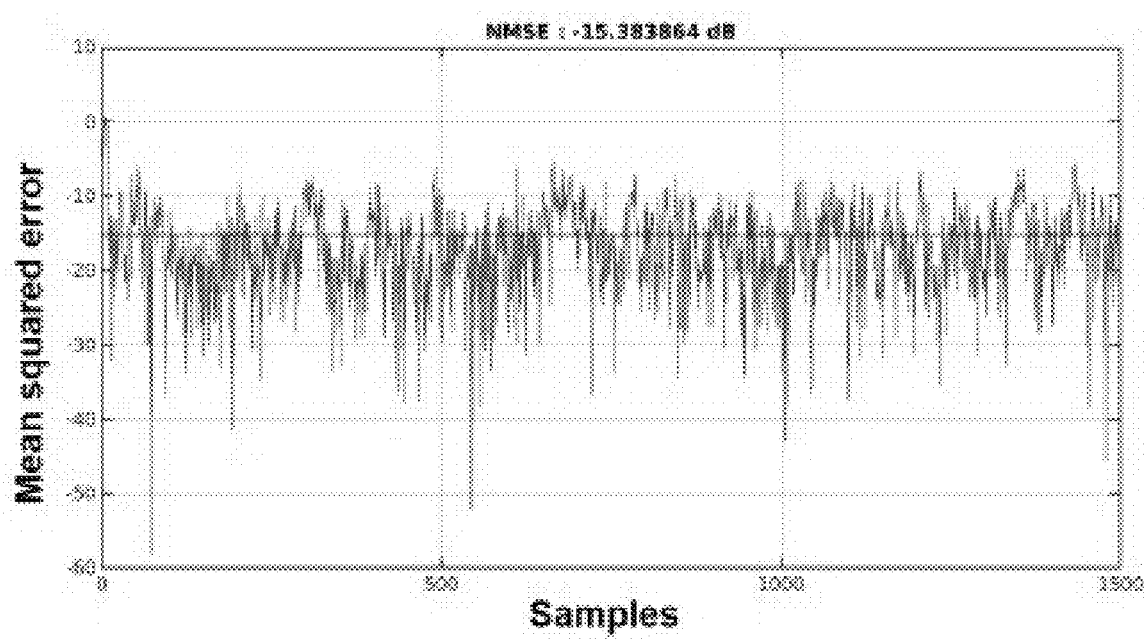
FIG. 11b shows a plot of mean squared error versus samples, showing measured test data from the experimental setup in FIG. 11a. The test data shows about 15.2 dB of jammer cancellation (in simulation).
Figure 12A:
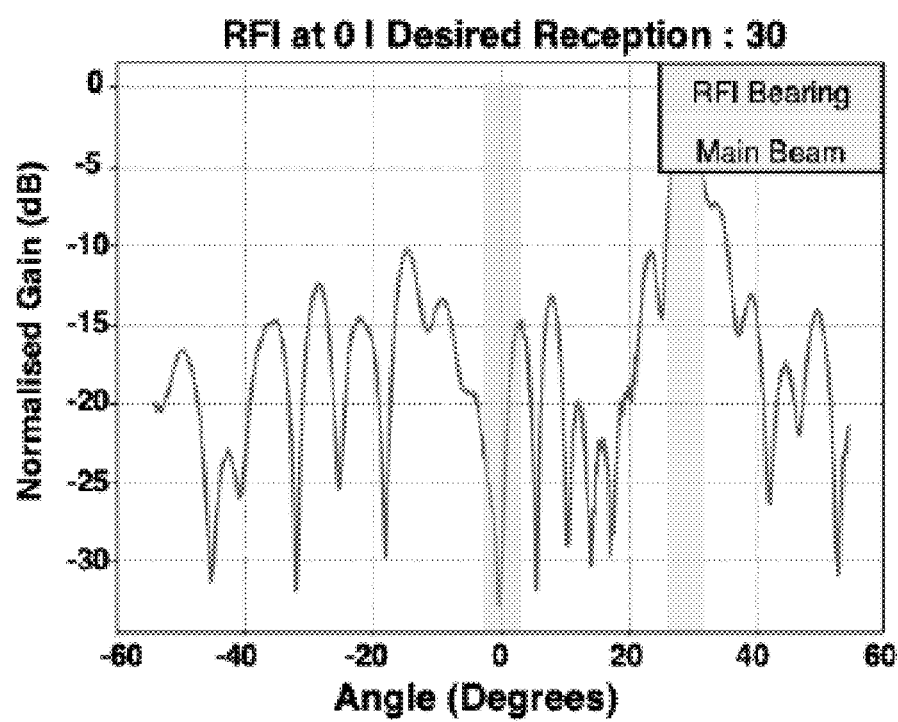
FIGS. 12a-12f show plots of normalized gain (in dB) versus angle (in degrees), showing measured array patterns from a real-time 32-channel classical Howells-Applebaum adaptive aperture.
Figure 12B:
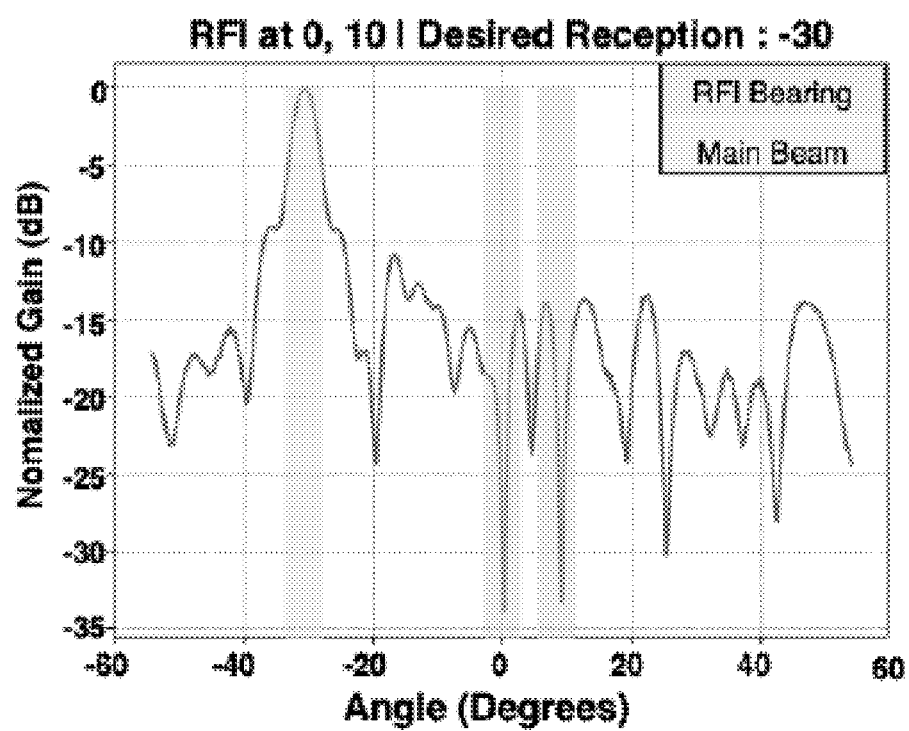
Figure 12C:
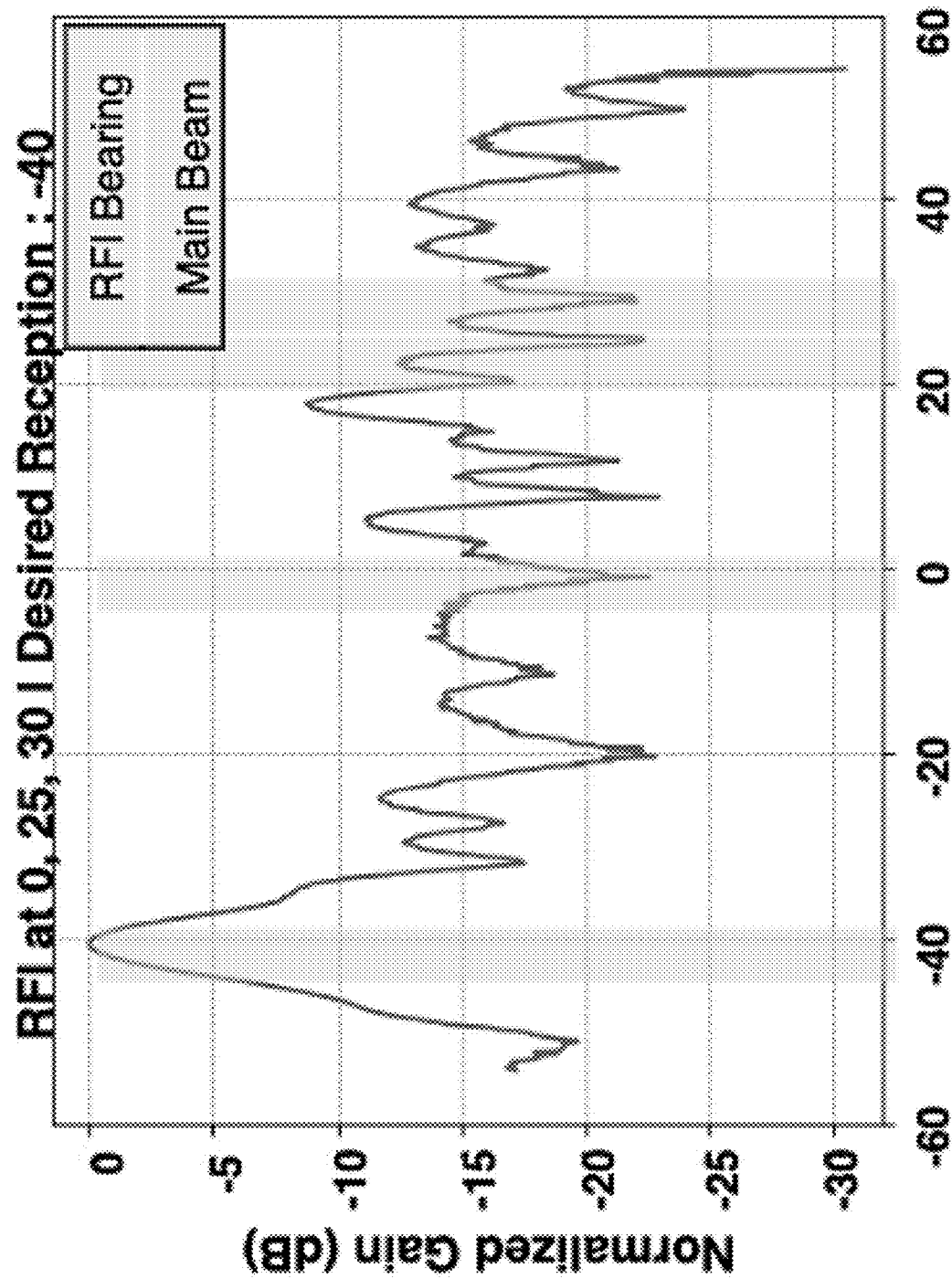
Figure 12D:
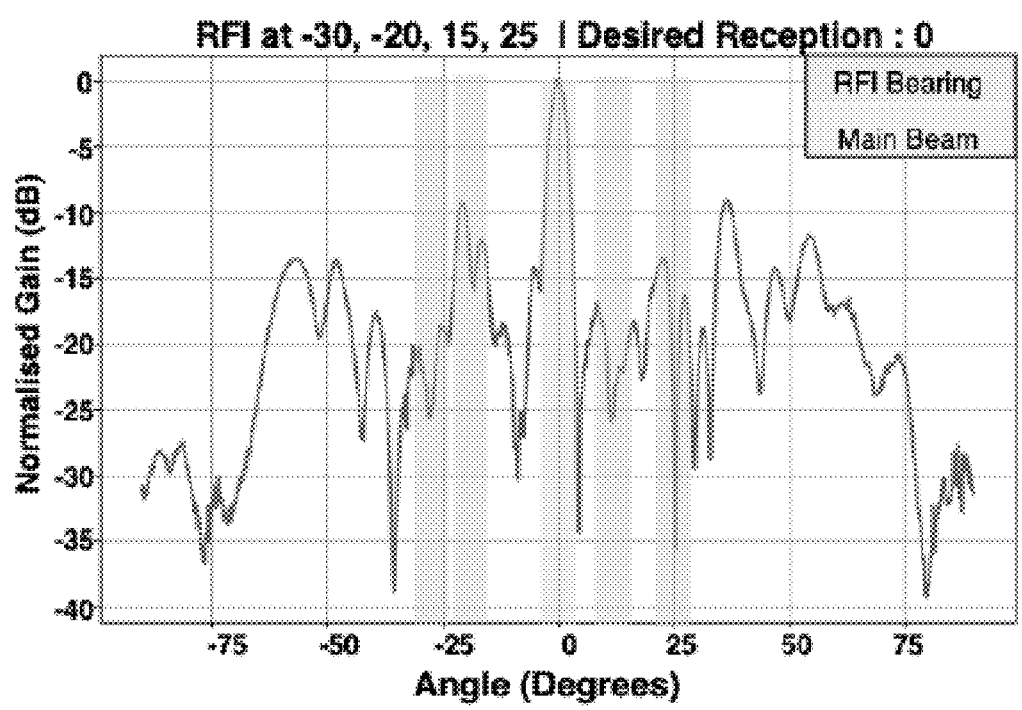
Figure 12E:
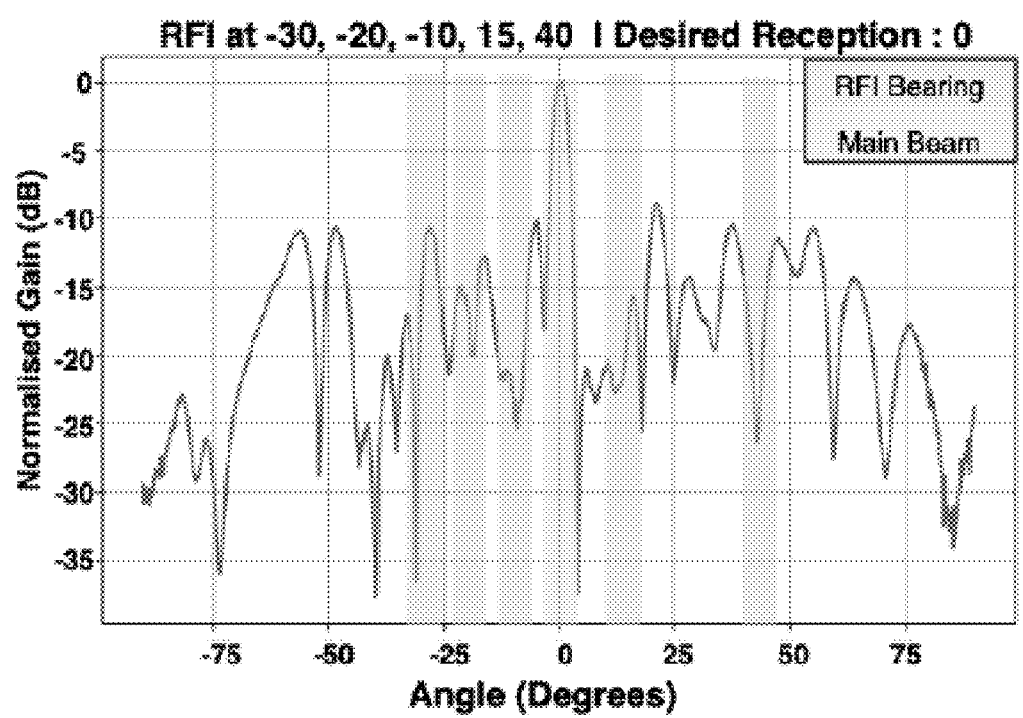
Figure 12F:
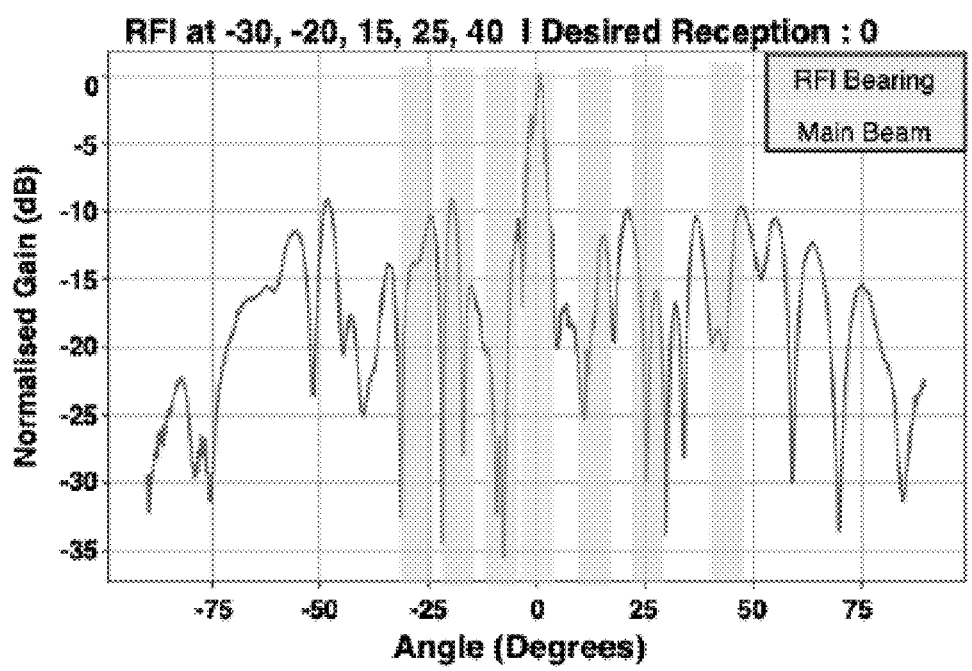
Figure 13A:
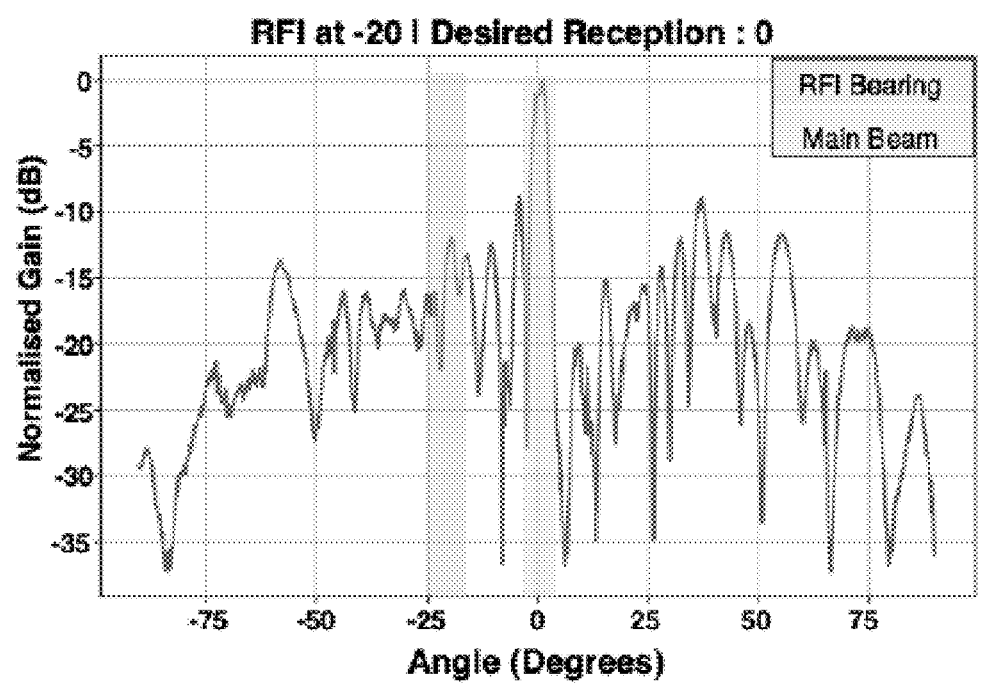
FIGS. 13a-13f show plots of normalized gain (in dB) versus angle (in degrees), showing measured array patterns from a real-time 32-channel hierarchical adaptive saperture. The measured patterns demonstrate that the algorithm maintains deep nulls at bearings where RFIs were placed. Adaptive nulling was achieved on a Xilinx Virtex-6 Sx475T FPGA.
Figure 13B:
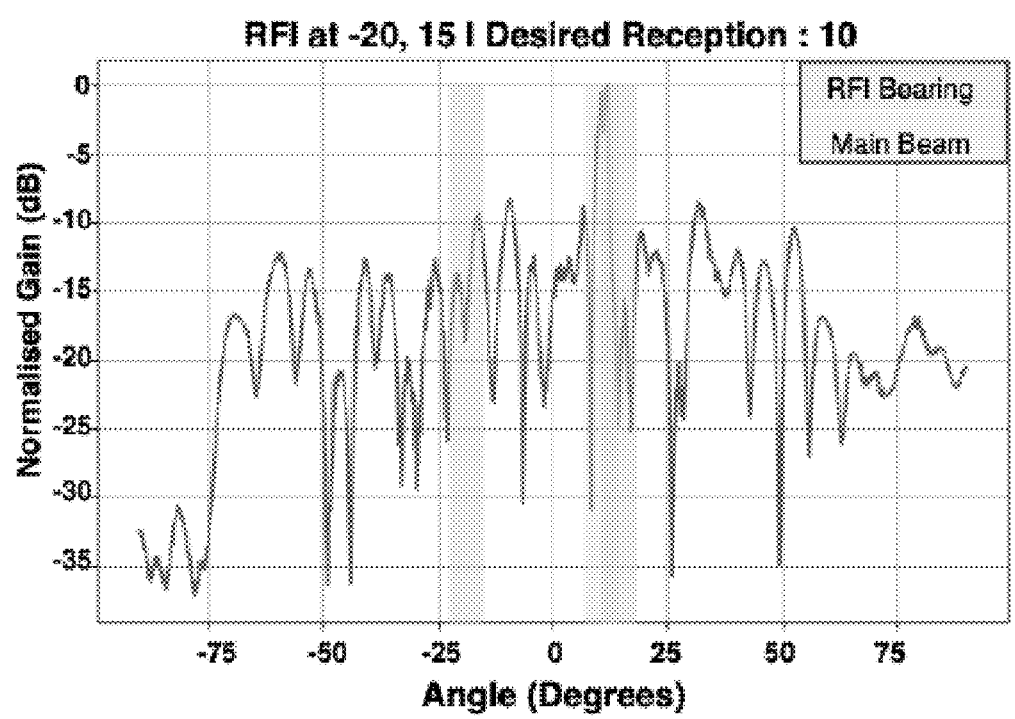
Figure 13C:
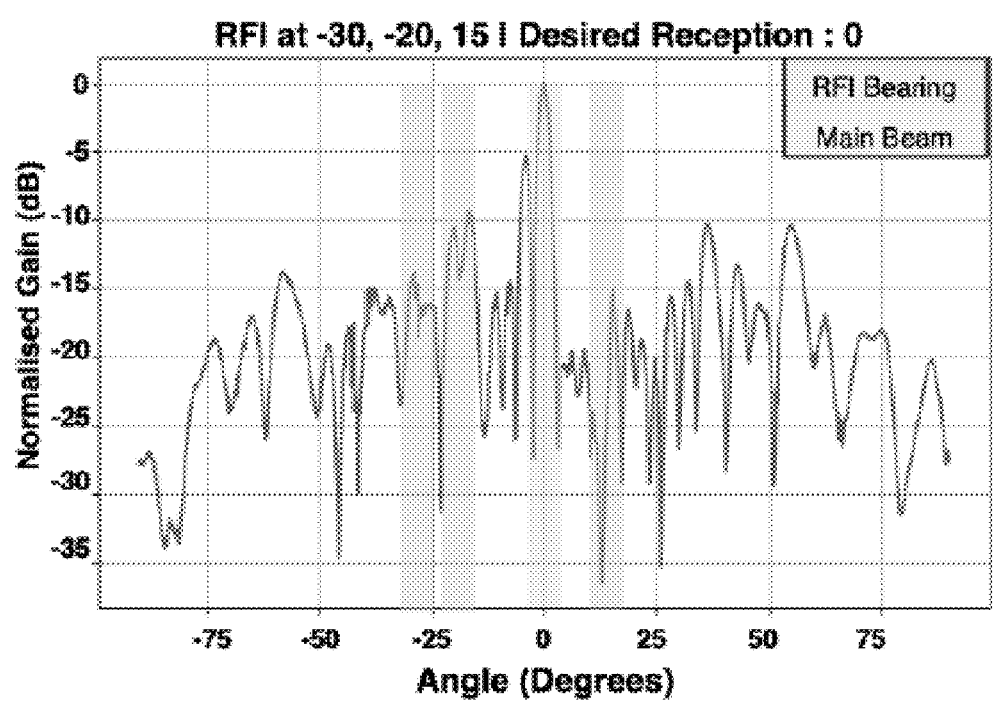
Figure 13D:
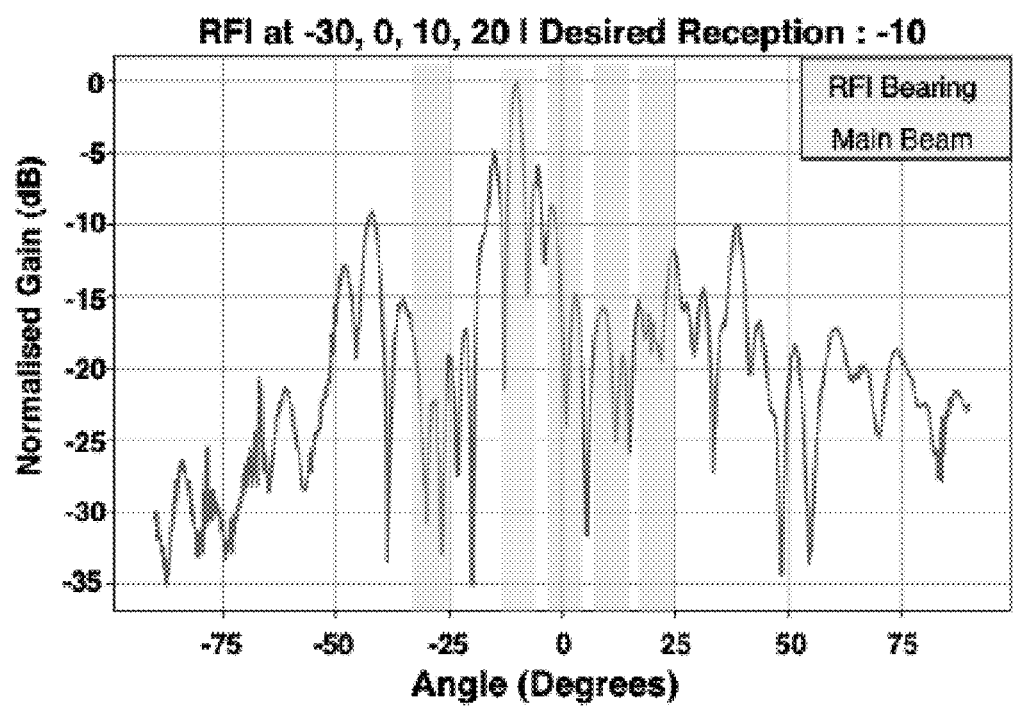
Figure 13E:
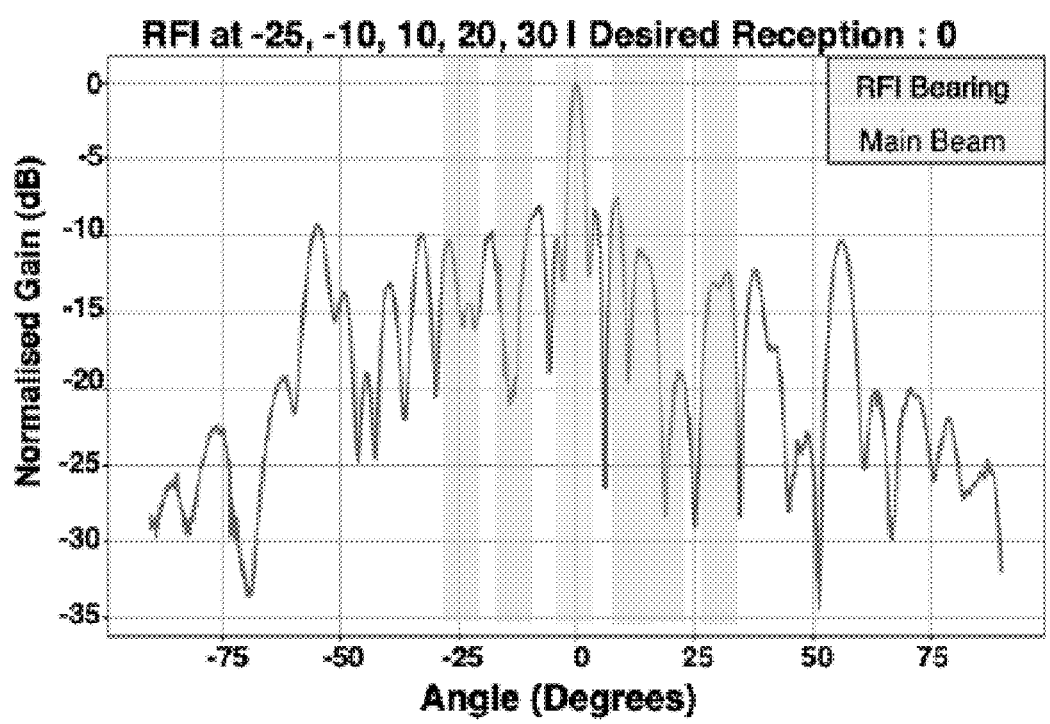
Figure 13F:
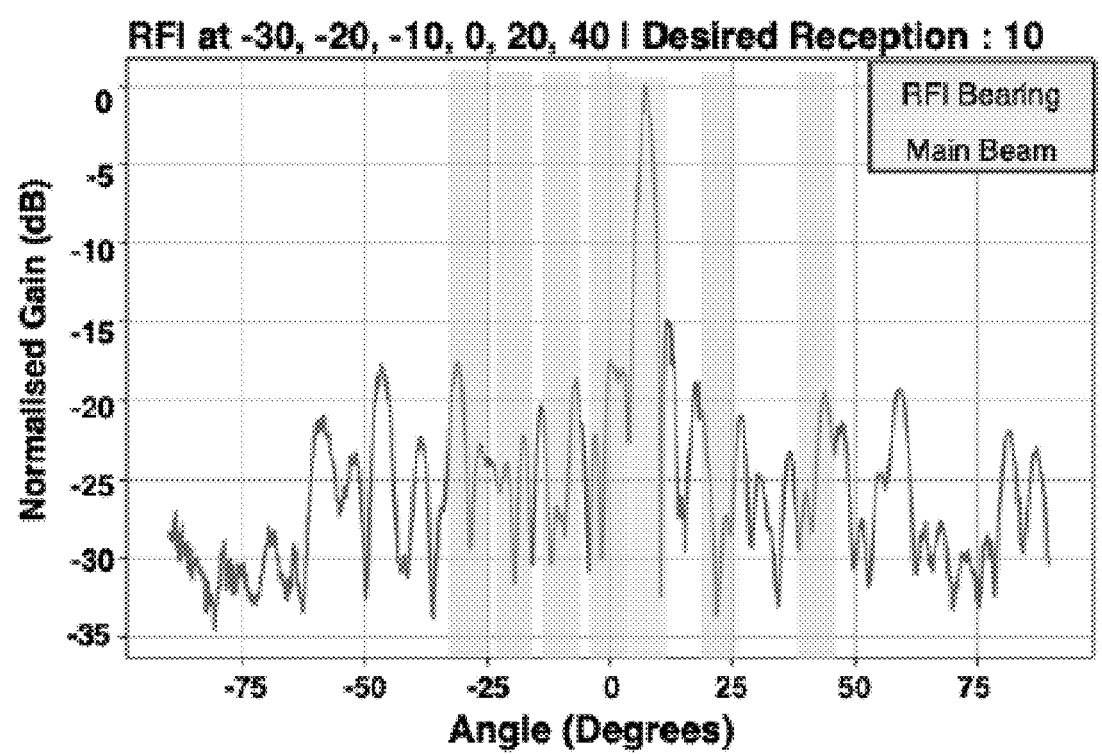

On the collected dataset, the neural network achieved a mean NSE of $\gamma_{AV}=-15.2$ dB in software. The time-domain performance of γ(n) is shown in FIG. 11b. The NSE was found via $$Y_{AV} = 10\log_{10}\left(\frac{1}{N}\sum_{n=1}^{N}\left(\frac{|ytest(n) - ypredict(n)|}{|ytest(n)|}\right)^2\right)$$

for N complex value samples.

Example 4

Experimental work was performed on low-complexity RFI adaptive nullforming and ai-based modulation recognition at the spectrum sensor. The system calibration was performed in two phases. Once the design was programmed onto the FPGA, the ADCs were enabled and calibrated using Ruby routines. After ADC calibration, the ADC output streams underwent digital fine calibration. To transmit the reference planar wave while system calibration, a two double-ridge guided horn antenna was used.

To transmit jamming signals, multiple ADALM PlutoS-DRs from Analog Devices were used. The required samples for null estimation were captured by transmitting a 5.88 GHz sinusoidal carrier mixed with a 10 MHz sinusoidal from each PlutoSDR at 0 dBm transmit power, positioned at distinct bearings, 15 meters away. The local oscillator frequency at the receiver was set to 5.88 GHZ, resulting in an intermediate frequency of 10 MHz, with the down-converted outputs digitized at a 200 MHz clock rate.

After capturing the snapshots of the interference signals, the optimum weight vectors at two distinct steps were computed using the modified Howells-Applebaum method (see FIG. 8) on the Linux host. The calculated weight values were then written to the software registers on the ROACH-2 platform. To evaluate the beamforming performance, power patterns were measured by transmitting a continuous-wave (CW) signal using a double-ridge guided horn antenna positioned at broadside (0° angle) and located 20 meters from the receiver array in an open outdoor setting.

The performance of non-hierarchical adaptive beamforming approach was tested by measuring and analyzing the measured array factors for six different RFI placement scenarios (see FIGS. 12a-12f) respectively having one to six RFIs. Peaks appeared at the expected angles in the beam steering vector while maintaining 10 dB directivity against the highest side lobe.

Nulls of depth about 35 dB were observed at the RFI angles in both one- and two-RFI cases. For three RFIs and higher number of RFIs up to six RFI scenarios, the system achieved over 20 dB null depths. The nulls are likely deeper, but precise measurement was difficult due to their sharp nature on the rotating platform. These results show the system effectively suppresses multiple interference sources.

Next, the performance of the hierarchical adaptive beamforming approach was tested by analyzing measured array factors for another set of RFI scenarios having one to six RFIs, respectively. The nulls were observed at the bearings where the RFIs were placed. Nulls were observed with cancellations in the range of 15 dB to 35 dB. Higher side-lobe levels were observed (approximately 5 dB increment) compared to the non-hierarchical approach (see also FIGS. 13a-13f).

Example 5

The impact of adaptive null-forming based jammer/RFI removal on AI-based spectrum perception was evaluated using a simple ML model for modulation recognition. Due to the complexity of the modulation recognition problem in real-world RF environments, only the simplest of cases was tested for. The experiments were on the RadioML2018.a dataset containing 24 modulations as it is a widely accepted standard. However, only 16-QAM and 32-QAM were used for testing the impact of RFI nulling. The constantly changing real-world RF environment within the university parking lot (at Florida International University in Miami, FL) where the experiments were carried out, including effects from WiFi and other unknown RFI sources, the effect of moving vehicles nearby, and the large number of pedestrian traffic in the vicinity made consistent and correct experiments for high-order modulated waveforms impossible. However, the effect on the real-time RFI nulling was verified through multi-level Howells-Applebaum adaptive arrays, which are Weiner-Hopt solutions optimum for the case of AWGN contamination on basic modulation recognition limited to 16/32-QAM.

DenseNet architecture was used, with 64 convolution layers, 4 dense layers, 3 max-pooling layers, and total parameters equal to 147902. The 4 dense layers were used to account for two additional modulation types. The DenseNet architecture is complex valued and was trained using IQ data from the spectrum sensor. The training included 10,000 frames including examples of each modulation scheme derived from the RadioML2018.a data. The number used for samples per frame was 1024 IQ. The training was conducted over the air with in-the-wild unknown RFI present (from WiFi and other sources). The air channel was about 10 meters from transmitter to array receiver, and direct broadside phased-array beamforming was used during training (no Howells-Applebaum adaptive beamformer used). The testing of the DenseNet model was conducted in a similar manner using a different set of measurements obtaining immediately after the training data was collected. Both training and testing for model accuracy was over-the-air and included unknown RFI from random sources. This provided the baseline for best-case accuracy of the system. The SINR for testing was measured to be 21.3 dB.

Once training and DenseNet model testing was conducted, with best case results summarized in the table in FIG. 14, three spatially separated RF sources driven by ADALM Pluto SDRs were then turned on, with output power 0 dBm and frequency 5.89 GHZ (unmodulated tones). The adaptation of the spatial nulling occurred from covariance matrix inversion across a two-level adaptation process. The measured results of the nulls at up to 6 RFI sources have been verified to be correct, with nulls as deep as 35 dB measured in real-time using on-FPGA beamforming. In the modulation recognition component of the experiment, the 3 RFI sources were spatially nulled on the FPGA real-time processing engine, and the resulting "cleaned" received waveforms were captured and ported to the Tensorflow framework. The signal to interference and noise (SINR) ratio improved from 8.7 dB to 22.2 dB due to the Howells-Applebaum adaptation (for 3 RFIs). Interestingly, the adaptive algorithm improved the SINR over the training case, and this is likely because of unknown real-world RFIs that are always present "in the wild" and tend to be reduced/removed as a result of the spatial null adaptation process. The modulation recognition performance summarized in the table in FIG. 14 plainly shows the importance of the spatial nulling on the AI-perception in a highly challenging RFI environment. Interestingly, the Howells-Applebaum adaptative beamformer (FIG. 8) provides improved SINR compared to the test-case with no RFIs turned on. Both cases included additional RFI that could not be controlled from "in the wild" sources, which makes the ML algorithm perform at a lower classification success rate despite the higher measured SINR during the RFI nulling experiment.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for beamforming, the system comprising:
    a plurality of subarrays, each subarray of the plurality of subarrays comprising a plurality of antennas;
    a plurality of approximate discrete Fourier transform (ADFT) beamformers; and
    an adaptive beamformer,
    the plurality of ADFT beamformers being configured to receive and process signals from the plurality of subarrays, respectively,
    the plurality of ADFT beamformers being configured to generate respective ADFT beamformer outputs after processing the signals from the plurality of subarrays, respectively,
    the adaptive beamformer being configured to receive and process the ADFT beamformer outputs and generate a final beamforming output.

2. The system according to claim 1, the adaptive beamformer being a Howells-Applebaum adaptive beamformer, a minimum variance distortionless response (MVDR) adaptive beamformer, or a linearly constrained minimum variance (LCMV) adaptive beamformer.

3. The system according to claim 1, the adaptive beamformer being a Howells-Applebaum adaptive beamformer.

4. The system according to claim 1, each ADFT beamformer of the plurality of ADFT beamformers being a 32-point ADFT beamformer.

5. The system according to claim 1, each subarray of the plurality of subarrays further comprising at least one amplifier connected to at least one antenna of the plurality of antennas of said subarray.

6. The system according to claim 1, each subarray of the plurality of subarrays further comprising at least one filter connected to at least one antenna of the plurality of antennas of said subarray.

7. The system according to claim 6, the at least one filter comprising at least one of a band-pass filter and a low-pass filter.

8. The system according to claim 1, each subarray of the plurality of subarrays further comprising at least one mixer connected to at least one antenna of the plurality of antennas of said subarray.

9. The system according to claim 1, further comprising at least one analog-to-digital converter (ADC) connected between each ADFT beamformer of the plurality of ADFT beamformers and the subarray from which said ADFT beamformer is configured to receive and process signals.

10. The system according to claim 1, further comprising at least one radio frequency (RF) chain connected between each ADFT beamformer of the plurality of ADFT beamformers and the subarray from which said ADFT beamformer is configured to receive and process signals.

11. A method for beamforming, the method comprising:
    providing a system comprising:
        a plurality of subarrays, each subarray of the plurality of subarrays comprising a plurality of antennas;
        a plurality of approximate discrete Fourier transform (ADFT) beamformers; and
        an adaptive beamformer;
    sending signals from the plurality of subarrays to the plurality of ADFT beamformers, respectively;
    processing, by the plurality of ADFT beamformers, the signals respectively received from the plurality of subarrays to generate respective ADFT beamformer outputs;
    sending the ADFT beamformer outputs from the plurality of ADFT beamformers to the adaptive beamformer; and
    processing, by the adaptive beamformer, the ADFT beamformer outputs to generate a final beamforming output.

12. The method according to claim 11, the adaptive beamformer being a Howells-Applebaum adaptive beamformer, a minimum variance distortionless response (MVDR) adaptive beamformer, or a linearly constrained minimum variance (LCMV) adaptive beamformer.

13. The method according to claim 11, the adaptive beamformer being a Howells-Applebaum adaptive beamformer.

14. The method according to claim 11, each ADFT beamformer of the plurality of ADFT beamformers being a 32-point ADFT beamformer.

15. The method according to claim 11, each subarray of the plurality of subarrays further comprising:
    at least one amplifier connected to at least one antenna of the plurality of antennas of said subarray;
    at least one filter connected to at least one antenna of the plurality of antennas of said subarray; and
    at least one mixer connected to at least one antenna of the plurality of antennas of said subarray.

16. The method according to claim 15, the at least one filter comprising at least one of a band-pass filter and a low-pass filter.

17. The method according to claim 11, further comprising at least one analog-to-digital converter (ADC) connected between each ADFT beamformer of the plurality of ADFT beamformers and the subarray from which said ADFT beamformer is configured to receive and process signals.

18. The method according to claim 11, further comprising at least one radio frequency (RF) chain connected between each ADFT beamformer of the plurality of ADFT beamformers and the subarray from which said ADFT beamformer is configured to receive and process signals.

19. A system for beamforming, the system comprising:
    a plurality of subarrays, each subarray of the plurality of subarrays comprising a plurality of antennas;

a plurality of approximate discrete Fourier transform (ADFT) beamformers; and an adaptive beamformer, the plurality of ADFT beamformers being configured to receive and process signals from the plurality of subarrays, respectively, the plurality of ADFT beamformers being configured to generate respective ADFT beamformer outputs after processing the signals from the plurality of subarrays, respectively, the adaptive beamformer being configured to receive and process the ADFT beamformer outputs and generate a final beamforming output, each subarray of the plurality of subarrays further comprising:
  at least one amplifier connected to at least one antenna of the plurality of antennas of said subarray;
  at least one filter connected to at least one antenna of the plurality of antennas of said subarray; and
  at least one mixer connected to at least one antenna of the plurality of antennas of said subarray, the at least one filter comprising at least one of a band-pass filter and a low-pass filter, and the system further comprising:
  at least one analog-to-digital converter (ADC) connected between each ADFT beamformer of the plurality of ADFT beamformers and the subarray from which said ADFT beamformer is configured to receive and process signals; and
  at least one radio frequency (RF) chain connected between each ADFT beamformer of the plurality of ADFT beamformers and the subarray from which said ADFT beamformer is configured to receive and process signals.

20. The system according to claim 19, the adaptive beamformer being a Howells-Applebaum adaptive beamformer, and each ADFT beamformer of the plurality of ADFT beamformers being a 32-point ADFT beamformer.

\* \* \* \* \*